United States Patent
Musolf et al.

(10) Patent No.: US 6,554,652 B1
(45) Date of Patent: Apr. 29, 2003

(54) JACK ASSEMBLY INCLUDING BALUNS INTERFACE; AND METHODS

(75) Inventors: Bruce Musolf, Eagan, MN (US); Douglas G. Elliot, Waconia, MN (US); Ravindra R. Khosla, Mapla Grove, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/077,575

(22) Filed: Feb. 15, 2002

(51) Int. Cl.[7] .............................................. H01R 17/18
(52) U.S. Cl. ....................................................... 439/668
(58) Field of Search ................................ 439/668, 669, 439/667, 666

(56) References Cited

U.S. PATENT DOCUMENTS

| | | |
|---|---|---|
| 3,109,997 A | 11/1963 | Giger et al. |
| 3,360,747 A | 12/1967 | Lancaster |
| 3,529,264 A | 9/1970 | Lancaster |
| 3,740,699 A | 6/1973 | Johnson et al. |
| 3,852,703 A | 12/1974 | Carney et al. |
| 4,017,770 A | 4/1977 | Valfre |
| 4,087,151 A | 5/1978 | Robert et al. |
| 4,087,648 A | 5/1978 | Giacoppo |
| 4,106,841 A | 8/1978 | Vladic |
| 4,154,994 A | 5/1979 | Seiden et al. |
| 4,237,352 A | 12/1980 | Seiden |
| 4,286,121 A | 8/1981 | Olszewski et al. |
| 4,439,809 A | 3/1984 | Weight et al. |
| 4,470,100 A | 9/1984 | Rebaudo et al. |
| 4,510,552 A | 4/1985 | Kanno et al. |
| 4,514,030 A | 4/1985 | Triner et al. |

(List continued on next page.)

FOREIGN PATENT DOCUMENTS

| | | |
|---|---|---|
| EP | 0 243 296 | 10/1987 |
| EP | 0 364 658 | 4/1990 |
| EP | 0 380 210 | 8/1990 |
| GB | 2115237 | 9/1983 |
| GB | 2133938 | 8/1984 |

OTHER PUBLICATIONS

Switchcraft® Brochure, "SNAP–56, Switchcraft New Advanced Plug–In", pp. 1–4, 1987.
Augat® Telzon®, "Now It Is", pp. 1–2.

(List continued on next page.)

*Primary Examiner*—Neil Abrams
*Assistant Examiner*—Phuong K T Dinh
(74) *Attorney, Agent, or Firm*—Merchant & Gould P.C.

(57) ABSTRACT

A jack and chassis assembly includes a baluns interface connected directly to the in/out wire wrap pins on the jacks. This helps to convert 75 ohm coaxial signals to 120 ohm twisted pair interface signals for equipment connections. The jack and chassis assembly includes at least one jack, a chassis defining a first frame holding the jack, a circuit board mounted to the first frame and in electrical contact with the jack, and a balun in electrical contact with the jack. Methods for assembling a jack and chassis assembly include mounting a jack onto a frame, providing a second frame holding a balun, and connecting the jack to the balun. A chassis assembly includes a first frame, and a second frame, with the first frame being mounted within the second frame. A method for servicing a jack assembly includes providing jacks mounted in a first frame in a chassis, providing a circuit board secured to the first frame and in electrical connection with each of the jacks, removing the first frame holding the jacks from a second frame supporting a panel of baluns electrically connected to the jacks, and providing a space between the plurality of jacks and the panel of baluns sufficient to permit service access to the jacks.

25 Claims, 17 Drawing Sheets

U.S. PATENT DOCUMENTS

| | | | |
|---|---|---|---|
| 4,536,052 A | | 8/1985 | Baker et al. |
| 4,588,251 A | | 5/1986 | Newton |
| 4,605,275 A | | 8/1986 | Pavel |
| 4,618,194 A | | 10/1986 | Kwilos |
| 4,650,933 A | | 3/1987 | Benda et al. |
| 4,737,113 A | | 4/1988 | Hopper et al. |
| 4,749,968 A | | 6/1988 | Burroughs |
| 4,768,961 A | | 9/1988 | Lau |
| 4,770,639 A | | 9/1988 | Lau |
| 4,797,114 A | | 1/1989 | Lau |
| 4,815,104 A | | 3/1989 | Williams et al. |
| 4,820,200 A | | 4/1989 | Lau |
| 4,840,568 A | | 6/1989 | Burroughs et al. |
| 4,941,165 A | | 7/1990 | Rademacher et al. |
| 5,145,416 A | * | 9/1992 | Cruise et al. ............... 439/188 |
| 5,199,878 A | | 4/1993 | Dewey et al. |
| 5,246,378 A | | 9/1993 | Seiceanu |
| 5,393,249 A | | 2/1995 | Morgenstern et al. |
| 5,399,878 A | * | 3/1995 | Flynn ........................ 250/589 |
| 5,432,847 A | | 7/1995 | Hill et al. |
| 5,439,395 A | | 8/1995 | Laukzemis |
| 5,467,062 A | | 11/1995 | Burroughs |
| 5,546,282 A | * | 8/1996 | Hill et al. .................... 361/752 |
| 5,552,962 A | | 9/1996 | Feustel et al. |
| 5,582,525 A | | 12/1996 | Louwagie et al. |
| 5,634,822 A | * | 6/1997 | Gunell ....................... 439/668 |
| 5,685,741 A | | 11/1997 | Dewey et al. |
| 5,879,197 A | * | 3/1999 | Dewey ........................ 439/188 |
| 5,938,478 A | * | 8/1999 | Werner ........................ 439/668 |
| 6,049,709 A | | 4/2000 | Anderson et al. |
| 6,116,961 A | * | 9/2000 | Henneberger et al. ...... 439/188 |
| 6,186,798 B1 | | 2/2001 | Follingstad et al. |

OTHER PUBLICATIONS

Telect®, "Quality and Designs, Our New DSX 3/4 Module", Spokane Industrial Park, Building 12, Spokane, Washington 99216, pp. 1–2.

AT&T Network Systems, "Technical Description, Western Electric® Products, 800–Series DSX Frame System", pp. 1–2, Jan. 1986, Issue 1.

ADC Telecommunications brochure, "DSX–1 Digital Signal Cross–Connect Modules, Panels, and Accessories", Sixth Edition, 85 pages, May 1998.

ADC Telecommunications brochure, "PxPlus™ DSI Digital Signal Cross–Connect", Jan. 1997, 12 pages.

ADC Telecommunications brochure, "84 Termination Modular Bantam Jack Panel", Sep. 1998, 2 pages.

ADC Telecommunications brochure, 112 Termination Bantam Jack Panel, May 1999, 2 pages.

ADC Communications brochure, "Mini DSX–3 Products", Jun. 1997, 38 pages.

* cited by examiner

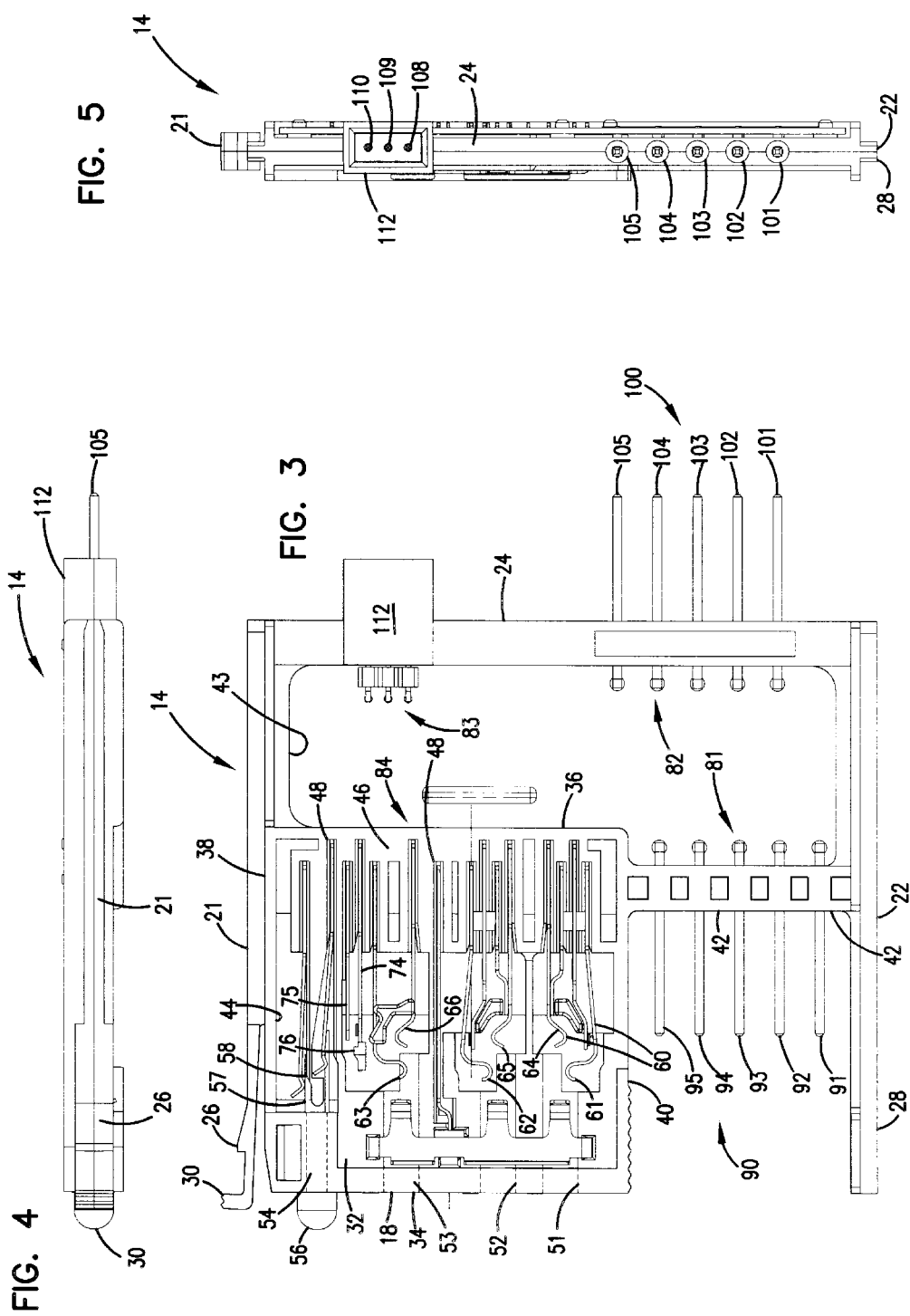

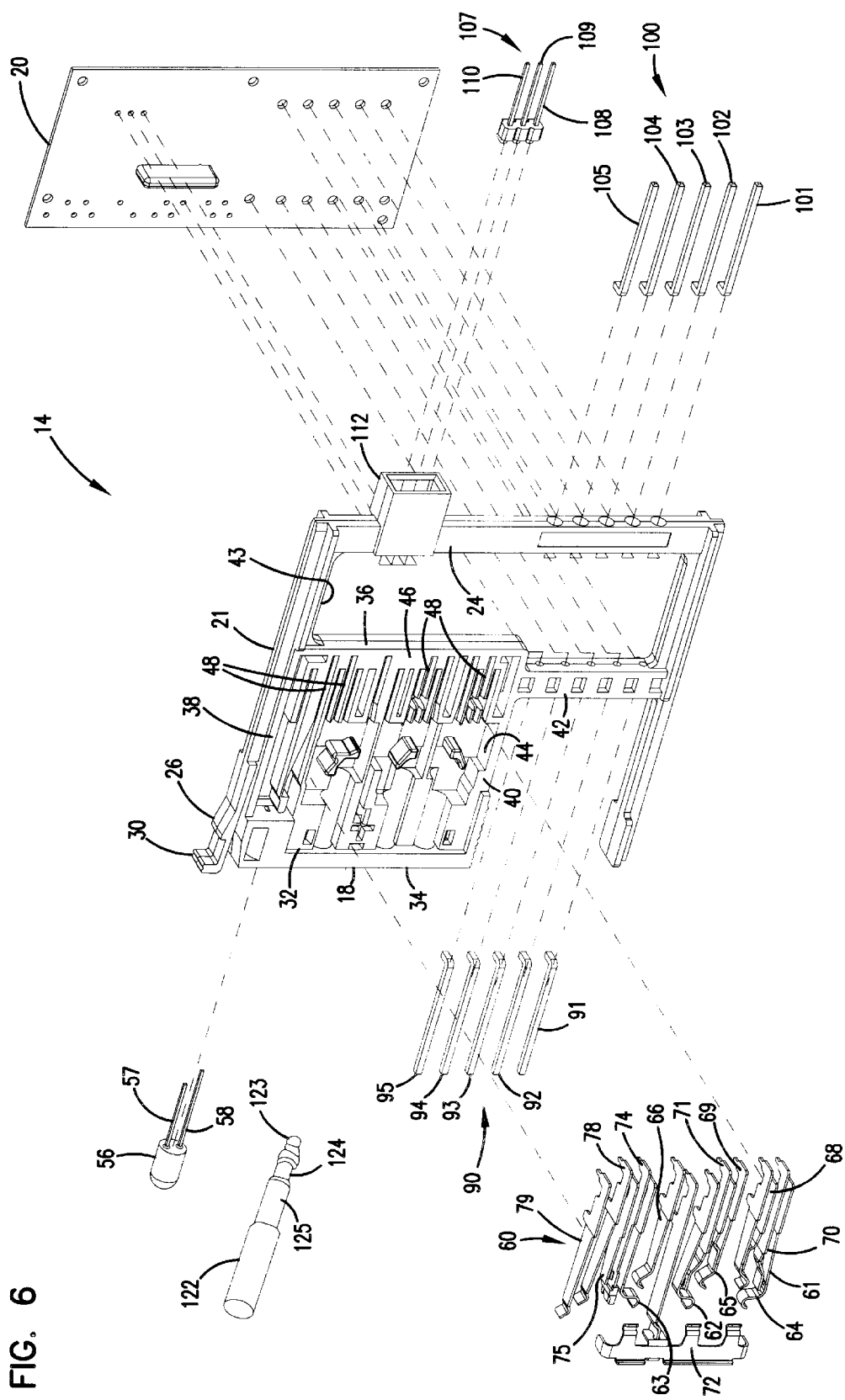

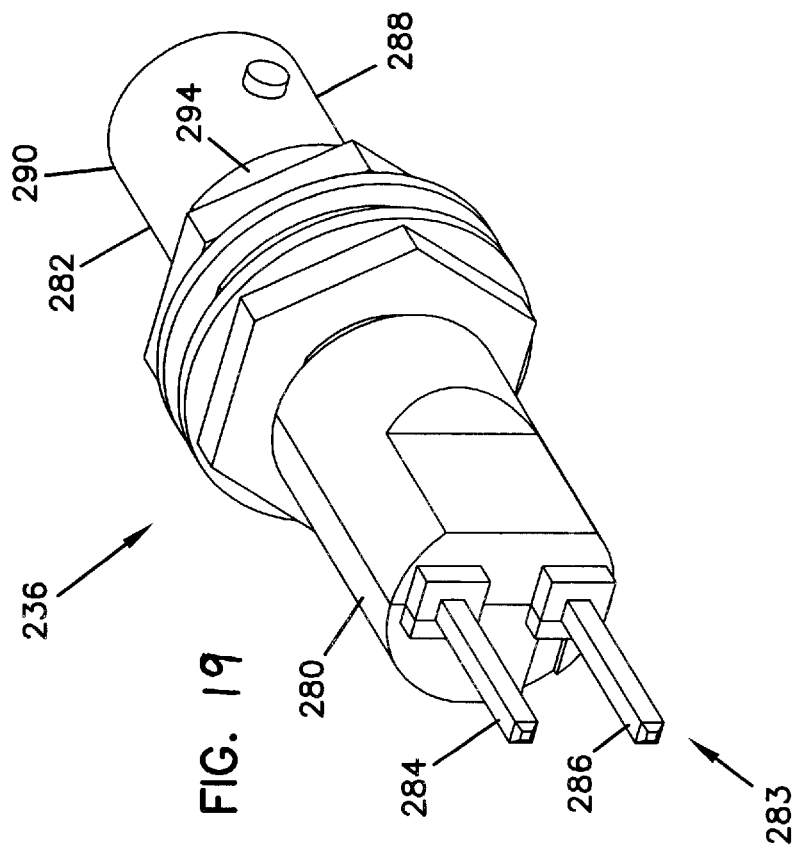
FIG. 19
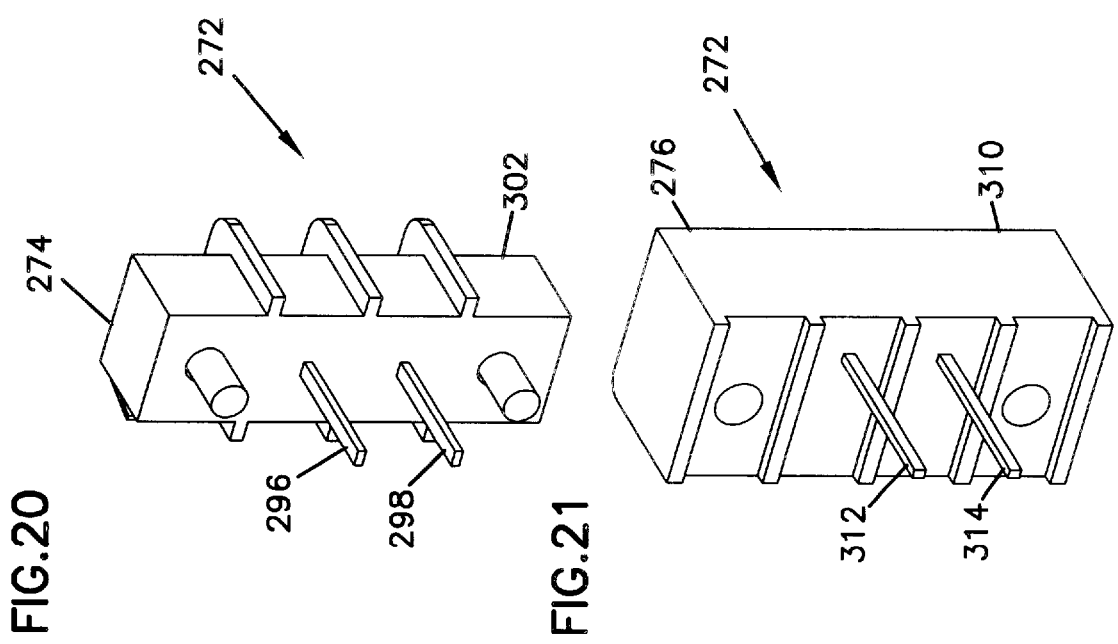
FIG. 20
FIG. 21

JACK ASSEMBLY INCLUDING BALUNS INTERFACE; AND METHODS

TECHNICAL FIELD

This disclosure relates generally to cross-connect assemblies. In particular, this disclosure relates to jacks, jack assemblies, digital cross-connect systems, baluns interfaces to coaxes, and methods utilizing these devices.

This disclosure describes additional features to the inventions described in commonly assigned and copending U.S. patent application Ser. No. 09/911,848 filed on Jul. 24, 2001, which is incorporated by reference herein.

BACKGROUND OF THE INVENTION

A digital cross-connect system (DSX) provides a location for interconnecting two digital transmission paths. The apparatus for a DSX is located in one or more frames, or bays, usually in a telephone central office. The DSX apparatus also provides jack access to the transmission paths.

DSX jacks are well known and include a plurality of bores sized for receiving tip and ring plugs. A plurality of spring contacts are provided within the bores for contacting the tip and ring plugs. The jacks are typically electrically connected to digital transmission lines, and are also electrically connected to a plurality of wire termination members used to cross-connect the jacks. By inserting plugs within the bores of the jacks, signals transmitted through the jacks can be interrupted or monitored.

SUMMARY

In one aspect, a jack and chassis assembly is provided. The assembly includes a jack, a chassis, a circuit board, and a balun. The chassis defines a first frame, and the jack is removably mounted to the first frame. The circuit board is mounted on the frame of the chassis and includes a socket that is in receipt of and in electrical contact with conductive pins on the jack. The balun is in electrical contract with a plurality of connection locations on the jack.

Preferably, there is a second frame that supports the balun. Preferably, the first frame is held by the second frame.

In another aspect, a method for assemblying a jack and chassis assembly includes providing a jack, providing a chassis including a first frame, operably mounting the jack onto the first frame, providing a second frame holding a balun, and connecting the jack to the balun.

In another aspect, a chassis assembly is provided including a first frame and a second frame. The second frame includes a first end flange, a second end flange, and a base extending between the first end flange and the second end flange. The first frame is mounted in the second frame over the base and between the first side flange and the second side flange.

In another aspect, a method for servicing a jack assembly is provided and includes providing a plurality of jacks mounted in a first frame in a chassis. A second circuit board is provided secured to the first frame and in electrical connection with each of the jacks. The first frame holding the plurality of jacks is removed from a second frame supporting a panel of baluns electrically connected to the jacks. While maintaining a connection between the plurality of jacks and the panel of baluns and maintaining the connection between the plurality of jacks and the second circuit board, a space is provided between the plurality of jacks and the panel of baluns sufficient to permit service access to the second plurality of connection locations of each of the jacks.

BRIEF DESCRIPTION OF THE DRAWINGS

FIG. 3 is a side elevational view of the jack depicted in FIG. 2;

FIG. 4 is an end elevational view of the jack depicted in FIGS. 2 and 3;

FIG. 5 is a rear end elevational view of the jack depicted in FIGS. 2–4;

FIG. 6 is an exploded, perspective view of the jack depicted in FIGS. 2–5;

FIG. 19 is an enlarged, perspective view of a balun;

FIG. 20 is an enlarged, perspective view of a first terminal block used in the assembly of FIGS. 11–18; and FIG. 21 is an enlarged, perspective view of a second terminal block used in the assembly depicted in FIGS. 11–18.

DETAILED DESCRIPTION

I. The Disclosure of U.S. Pat. No. 09/911,848; FIGS. 1–10

Figure 1:
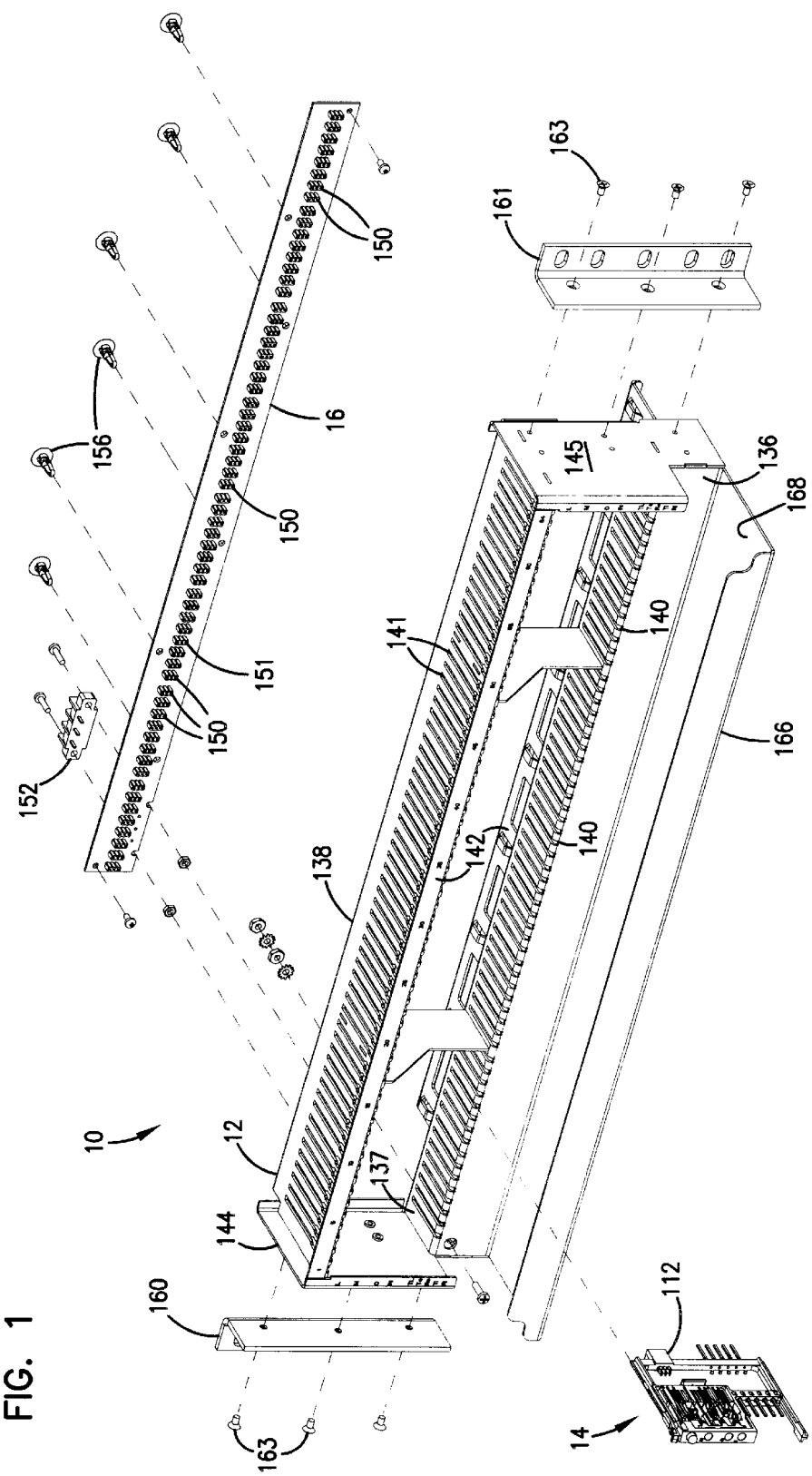
FIG. 1 is an exploded, perspective view of a jack assembly described in U.S. patent application Ser. No. 09/911,848.

In reference to FIG. 1, a jack and chassis assembly is shown generally at 10. Jack and chassis assembly 10 includes a housing or chassis 12 and at least one, but preferably a plurality, of jacks 14. In this drawing, only a single jack 14 is depicted, for purposes of clarity. Each jack 14 is identical. Thus, a description of one will suffice as a description of all jacks. Also depicted in FIG. 1 is a printed circuit board 16, whose function is described further below.

A. Jack Body and Cover

Jack 14 includes a jack body 18, a circuit board 20, and a plurality of wire wrap termination pins and spring contacts as will be described below. In reference to FIGS. 2–6, the jack body 18 is formed of plastic or any suitable dielectric material. Preferably, jack body 18 and its elements are integrally formed by injection molding.

Jack body 18 includes parallel upper and lower rails 21, 22. Rear ends of rails 21, 22 are joined by a vertical post 24. The forward end of rail 20 is provided with a resilient cantilevered portion 26 that includes an operator engageable tab 30 to permit the jack 14 to be selectively mounted and locked within the chassis 12. The lower rail 22 has a smooth, slide surface 28, that slidably engages a slot or groove in the chassis 12, as will be further described below.

Connected to the upper rail 21 at its forward end is a spring housing portion 32 of the body 18. The housing 32 includes forward wall 34 that extends from a forward end of the upper rail 21 toward the lower rail 22. Intermediate the forward wall 34 and the vertical post 24, the spring housing portion 32 includes a rear wall 36 that also extends partly the distance from rail 20 toward rail 21. Forward wall 34 and rear wall 36 are joined by top wall 38 and bottom wall 40. At the point of intersection of rear wall 36 and bottom wall 40, the housing portion 32 is connected to the lower rail 22 by an intermediate vertical post 42. Rear wall 36, vertical post 24, intermediate post 42, and rails 20, 21 all cooperate to define area 43.

Figure 2:
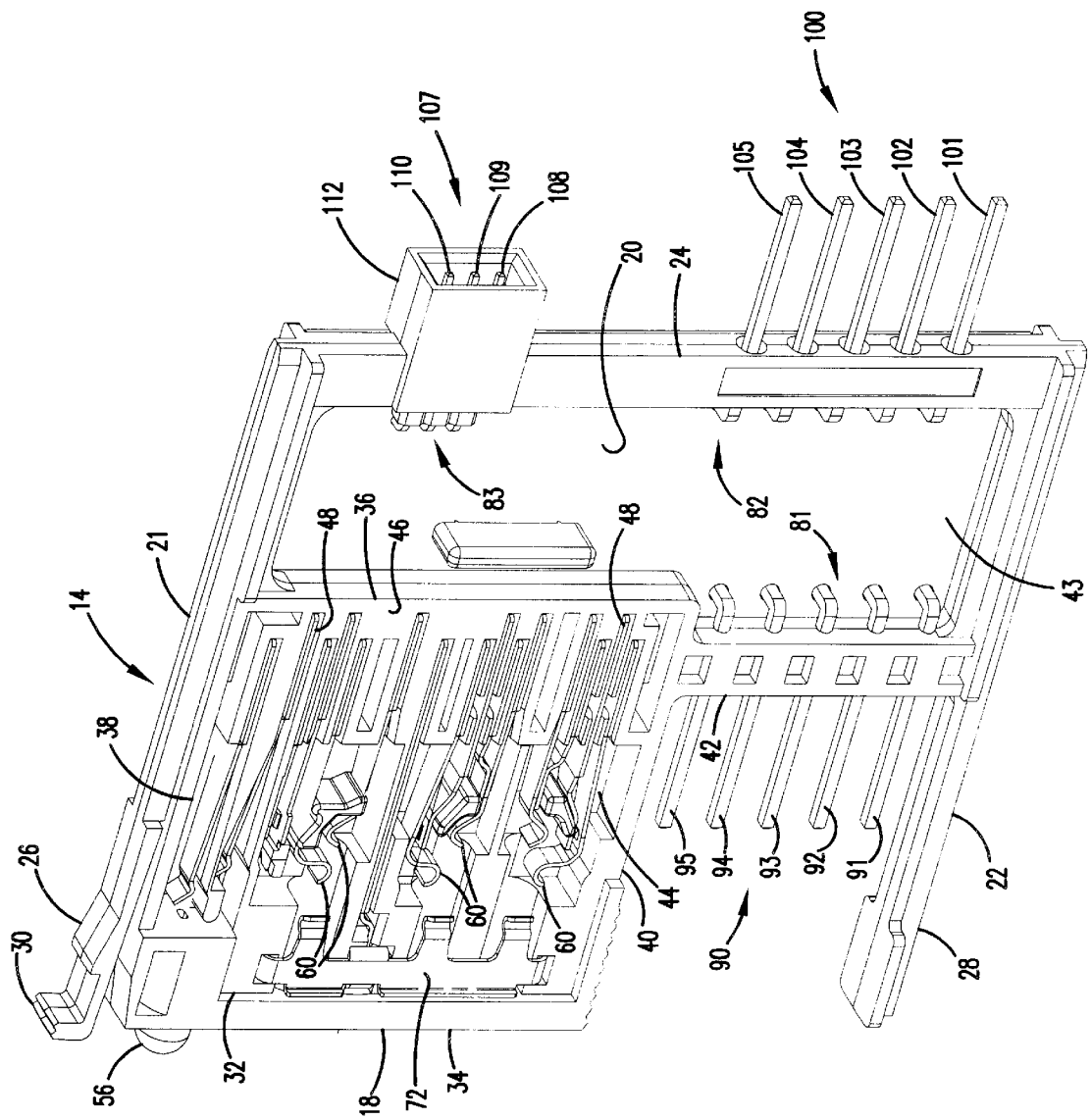
FIG. 2 is a perspective view of a jack utilized in the jack assembly depicted in FIG. 1.

As can be seen in FIGS. 2 and 6, the spring housing portion 32 is recessed to define a chamber 44. Within the chamber 44, a plurality of raised platforms 46 are disposed along the rear wall 36.

In the preferred embodiment illustrated, the platforms 46 define a plurality of parallel aligned spaced apart spring receiving slots 48. The slots 48 are parallel to the top and bottom walls 38, 40. The slots 48 help to hold the springs, as described further below. The forward wall 34 of the spring housing portion 32 is provided with three bores 51, 52, 53 (shown with hidden lines in FIG. 3), in communication with chamber 44. For convenience, bore 51 will be referred to as IN bore 51; bore 52 will be referred to as OUT bore 52; and bore 53 will be referred to as monitor or MON bore 53. Each of the bores 51, 52, 53 is sized to receive a standard tip and ring plug 122 (FIG. 6) of known dimensions. One such plug is described in U.S. Pat. No. 4,840,568, which disclosure is incorporated herein by reference. As known in the art, the plugs 122 include a tip contact 123, a ring contact 124, and a cylindrical sleeve 125.

The forward wall 34 further includes a fourth bore 54 sized to receive a light emitting diode (LED) 56. As can be seen in FIGS. 3 and 6, the LED 56 includes a pair of electrical leads 57, 58 that extends from the light of the LED 56.

B. Spring Contacts

A plurality of spring contacts 60 are disposed within the chamber 44. The spring contacts 60 include ring spring contacts 61, 62, 63 (FIG. 6), which are disposed within the spring housing portion 32 to make electrical connection with the ring contacts 124 of the tip and ring plugs 122 inserted within the bores 51, 52, 53. Similarly, the spring contacts 60 include tip contacts 64, 65, 66 disposed within the chamber 44 to make electrical contact with the tip contacts 123 of plugs 122 that are disposed within the bores 51, 52, 53.

The spring contacts 60 also include tip normal spring contacts 68, 69 that are disposed within the chamber 44 for tip normal contact 68 to be in electrical contact with tip contact 64 when no plug 122 is inserted within the IN bore 51. Similarly, tip normal contact 69 is disposed within the chamber 44 to make electrical contact with tip ring contact 65 when no plug 122 is received within the OUT bore 52.

The plurality of spring contacts 60 further includes ring normal contacts 70, 71. Ring normal contacts 70, 71 are configured to be in electrical contact with ring contacts 61, 63 when no plugs 122 are inserted within the bores 51, 52.

The plurality of spring contacts 60 also includes contact 72, which is a grounding contact. Grounding contact 72 is constructed and arranged within the chamber 44 to engage sleeves 125 of plugs 122 that are received within the bores 51, 52, 53.

Spring contacts 60 also includes LED circuit actuating contacts 74, 75. A free end of contact 74 is provided with a sleeve 76 of dielectric material. Upon insertion of a plug within bore 53, ring contact 63 is displaced and sleeve 76 urges contact 74 against contact 75.

Spring contacts 60 further includes LED contacts 78, 79. The LED contacts 78, 79 are positioned to contact the electrical leads 57, 58 of LED 56 inserted within bore 54.

C. Circuit Board

Circuit board 20 is sized to cover the area 43 bounded by top rail 21, bottom rail 22, vertical post 24, and intermediate post 42.

Circuit board 20 is of standard construction and includes four sets of contact points 81, 82, 83 and 84. Circuitry of the board 20 includes a plurality of circuit paths, shown generally at 86 in FIG. 7, to provide electrical contact between the contact points 81–84. The contact points 84 correspond to termination points of the springs 60. The other contact points 81, 82, 83 are described below. The circuitry is also described below.

D. Connective Locations

In reference again to FIGS. 2–6, a first plurality 90 of connective locations, shown as wire termination pins, in particular, five wire wrap termination pins 91–95 project and extend from the intermediate post 42 and are aligned in a plane generally parallel to and in parallel alignment with the spring contacts 60. As can be seen in FIG. 2, the wire wrap termination pins 91–95 have 90 degree bends terminating at the first contact points 81 on the circuit board 20.

Extending from the vertical post 24 and projecting therefrom is a second plurality 100 of connective locations, shown as wire termination pins, specifically five wire wrap termination pins 101–105. Each of pins 101–105 also has 90 degree bends and terminates at the second contact points 82 of the circuit board 20.

A plurality 107 of conductive pins 108, 109, 110 extends and projects from the vertical post 24. Each of pins 108–110 has a 90 degree bend that terminates at third contact points 83.

The plurality of pins 107 is enclosed by a surrounding wall or shroud 112. As can be seen in FIGS. 2 and 6, the shroud 112 has a rectangular cross-section and is generally box shaped to enclose the pins 108–110 except for the end tips. The shroud 112 helps to protect the plurality of pins 107 and also helps to provide a positive guide to help position the jack 14 properly within the printed circuit board 16 of the chassis 12 (FIG. 1).

Thus, as can be seen, in the preferred embodiment, the jack 14 includes first, second, and third sets 90, 100, and 107, respectively, of a plurality of pins extending therefrom. The function of each of the pin sets 90, 100, 107 will be become clearer after a review of the circuitry, discussed below.

While pins are illustrated in the preferred embodiment, those skilled in the art will appreciate that instead of pins, either IDC terminations or balun terminations bay be substituted for pins and accomplish the same result.

E. Circuitry

The circuitry of circuit board 20 includes the circuit paths 86 connecting various combinations of the contact points 81–84. The circuitry includes circuit elements to provide well known DSX jack functions. It should be appreciate that DSX jack circuitry is conventional and known in the art. One description can be found in U.S. Pat. No. 4,840,568, which disclosure is incorporated herein by reference.

Figure 7:
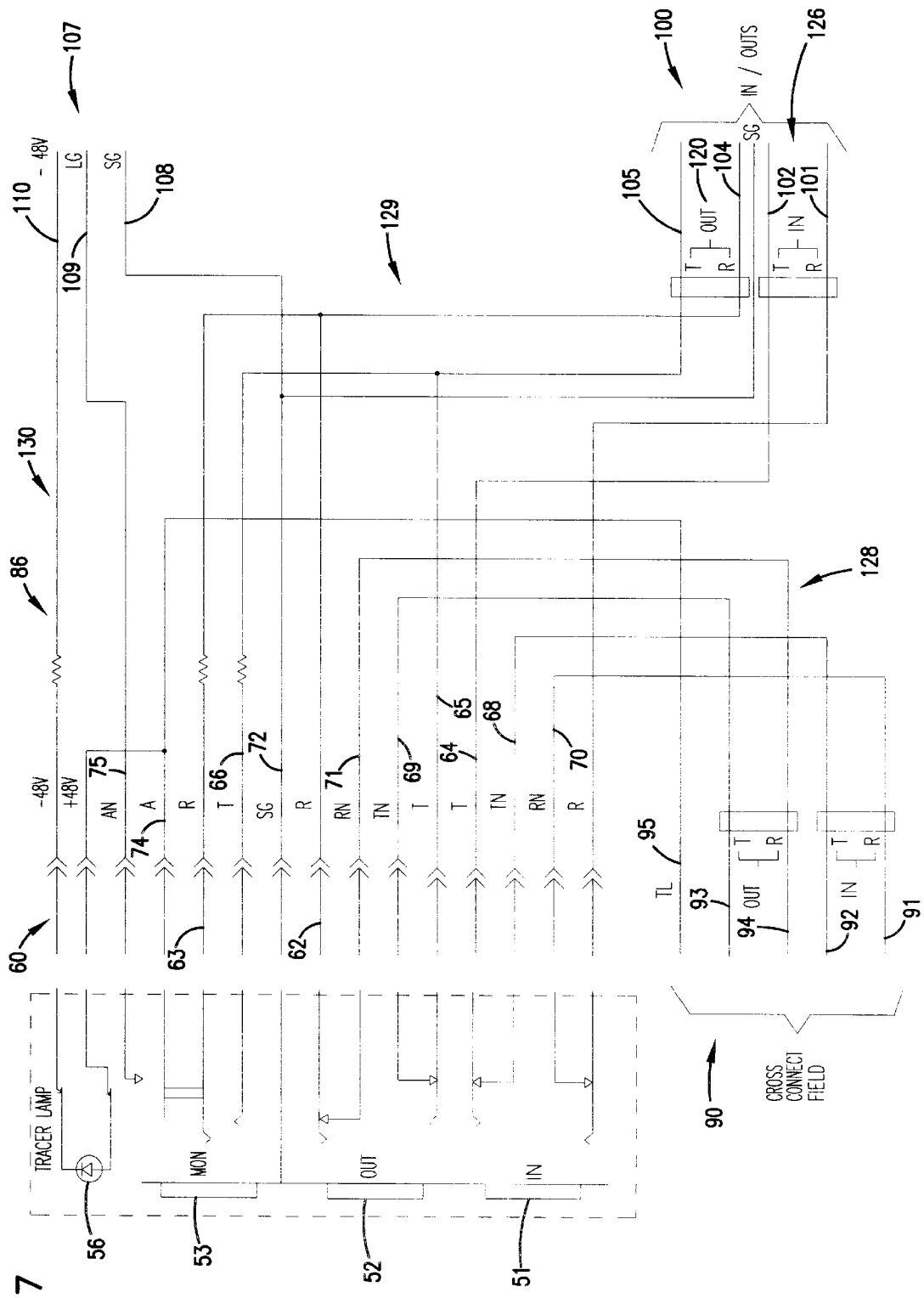
FIG. 7 is a schematic representation of the circuitry of the jack of FIGS. 2–6.

In FIG. 7, the circuitry is depicted schematically. In FIG. 7, the circuit paths 86 include a first, second, and third plurality of circuit paths 128, 129, 130. The first plurality of circuit paths 128 is disposed on the circuit board 20 to make electrical contact between the spring contacts 60 and the first plurality of connective locations 90. The second plurality of circuit paths 129 is configured to make electrical contact between the spring contacts 60 and the second plurality of connective locations 100. The third plurality of circuit paths 130 is oriented on the circuit board 20 to make electrical contact between the LED contacts 78, 79 and the plurality of conductive pins 107.

As shown in the schematic of FIG. 7, only seven of the contact points 101–105 and 108–110 are necessary for conventional DSX jack operation. The seven DSX contact points are OUT signal tip and ring contacts 104, 105; IN signal tip and ring contact 102, 101; sleeve ground contact 103 and 108; LED ground contact point 109; and an energized contact point 110 for illuminating the LED 56.

The circuitry is configured to accept an OUT signal 120 having a tip line and a ring line each connected to pin 105 and pin 104, respectively. When no plugs 122 are inserted within the bores 51, 52, 53, this signal is sent through the spring contacts 60 and to cross-connect pins 93, 94.

Cross-connection of a signal from another jack arrives as an IN signal from cross-connect wire termination pins 91, 92. With no plugs 122 inserted within the jack, the signal is output at IN signal point 126, and specifically through pins 102, 101.

By inserting plug 122 within the IN bore 51, the IN signal from cross-connected jack can be interrupted, and a signal from the inserted plug 122 can be outputted at points 102, 101. Similarly, by inserting plug 122 within the OUT bore 52, the signal from points 104, 105 is interrupted and may be outputted to the tip and ring contacts of the plug 122.

Note that the pin 108, associated with the sleeve ground, is grouped with the third set of pins 107. Upon insertion of plug 122, the sleeve 125 will be grounded through contact with the ground 72. The pin 108 is in contact with a ground connection in the circuit board 16, as will be described below.

It may be desirable to monitor signals on the OUT line without interrupting the OUT line signal. To accomplish this, plug 122 is inserted into the MON bore 53. On this occurrence, ring contact 63 is displaced and sleeve 76 acts against spring contact 74 urging it into electrical connection with contact 75. As is clear from FIG. 7, electrical connection of spring contacts 74, 75 connects the LED lamp to ground, thereby illuminating the LED.

In addition to activating the LED 56, insertion of plug 122 into the MON bore 53 also grounds the tracer lamp pin 95. This causes illumination of an LED on a jack to which the present jack is cross-connected.

F. Mount Description

Figure 8:
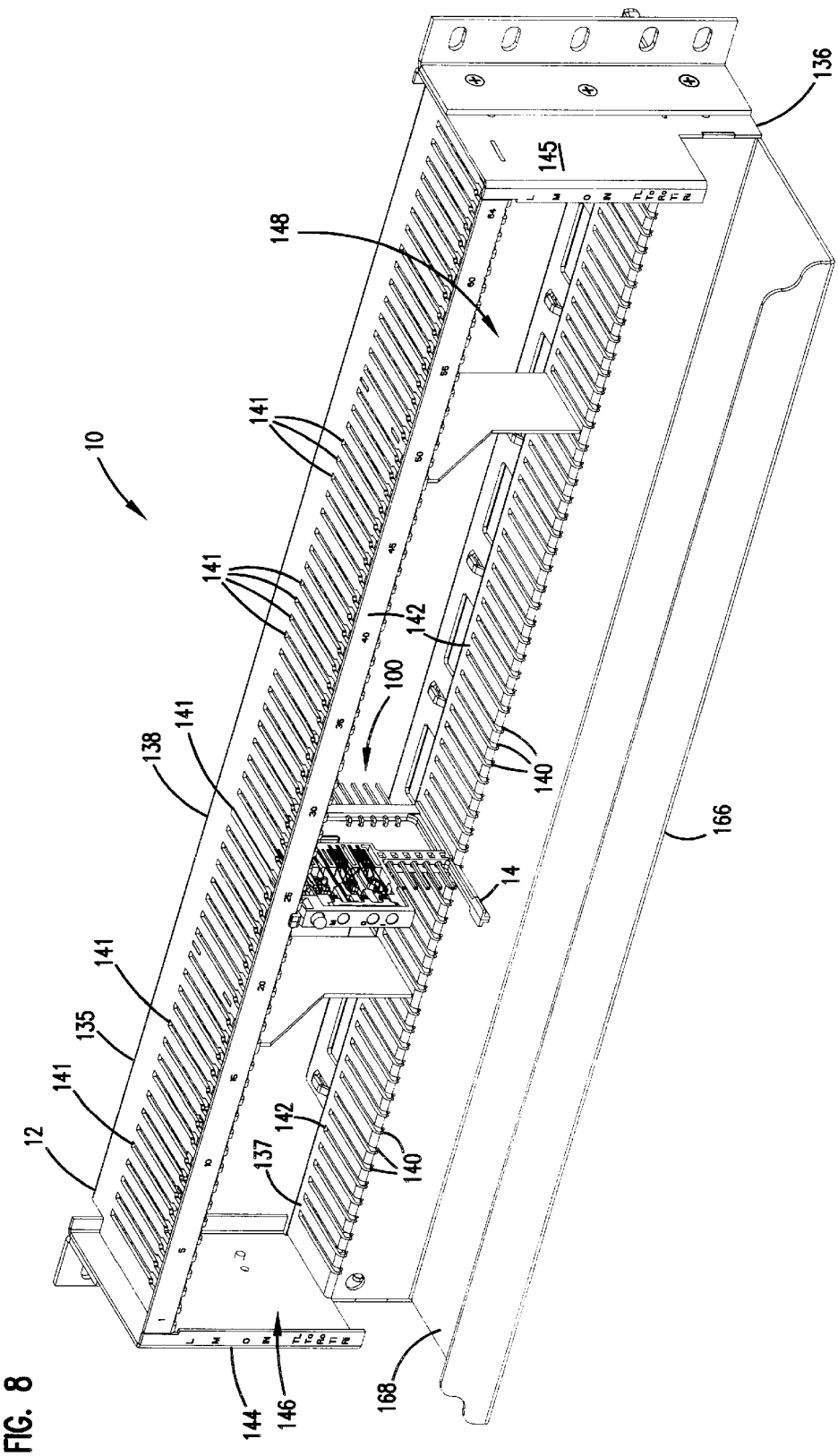
FIG. 8 is a perspective view of the jack assembly of FIG. 1 and assembled together.
Figure 9:
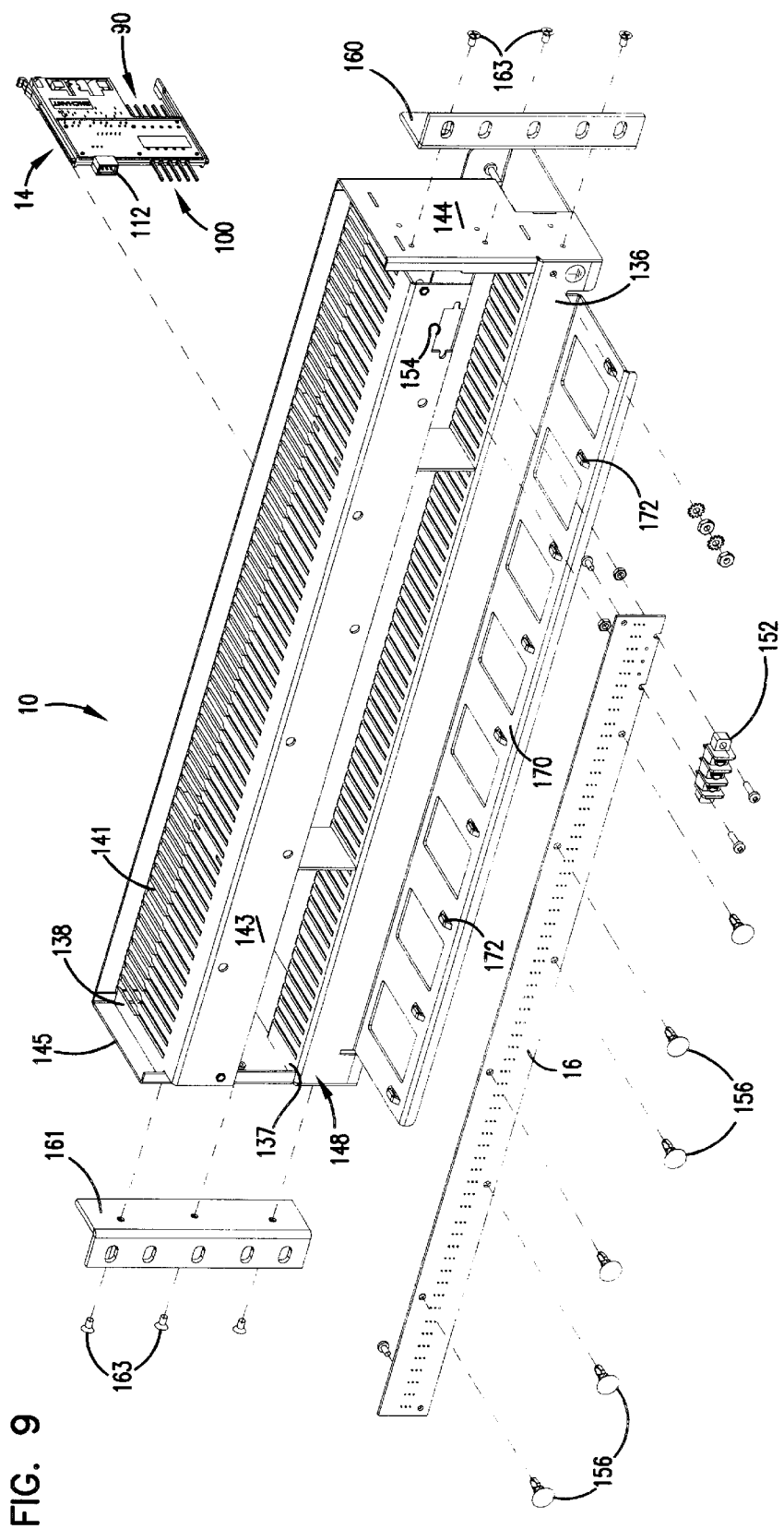
FIG. 9 is an exploded perspective view of the jack assembly shown in FIGS. 1 and 8, and view from an opposite perspective as FIG. 1.

In reference now to FIGS. 1, 8, and 9, the jack and chassis assembly 10 is shown. The chassis 12 includes a frame 135. The frame 135 includes a base 136 forming a bottom of the chassis 12. The frame 135 also includes first and second longitudinally extending walls 137, 138, parallel to each other and in opposing relation to each other. The first longitudinally extending wall 137 defines a first plurality of receiving slots 140. The second longitudinally extending wall 138 also defines a plurality of receiving slots 141 in alignment with the first plurality of slots 140. Because the slots 140, 141 are in alignment, each pair forms an aligned slot pair 142. Each of the aligned slot pairs 142 is sized to receive jack 14 therewithin. In FIG. 8, one of the jacks 14 is shown disposed within slots 140, 141.

The frame 135 also includes first and second side walls 144, 145 extending between the longitudinal walls 137, 138. Extending between the side walls 144, 145, and depending from longitudinal wall 138 is a circuit board mounting wall 143 (FIG. 9). As can be seen in FIGS. 8 and 9, the first and second side walls 144, 145 and the first and second longitudinally extending walls 137, 138 define an open, unobstructed front face 146 and an open, unobstructed back face 148. The front face 146 is in open communication with each of the aligned slot pairs 142. As such, each jack 14 can be mounted through the front face 146 by sliding the jack 14 into a pair of slots 140, 141. The back face 148 is in open communication with at least the first plurality of receiving slots 140. The second plurality of receiving slots 141 is bordered by the printed circuit board 16 and the circuit board mounting wall 43. As such, the back face 148 is defined by the edge of the circuit board mounting wall 143, the side walls 144, 145, and the longitudinal wall 137.

As can be seen in FIG. 8, the second plurality of connective locations 100 of each jack 14 extends and projects through the open back face 148. In this manner, the pins 101–105 may be directly wired by the technician through the back face 148.

Figure 10:
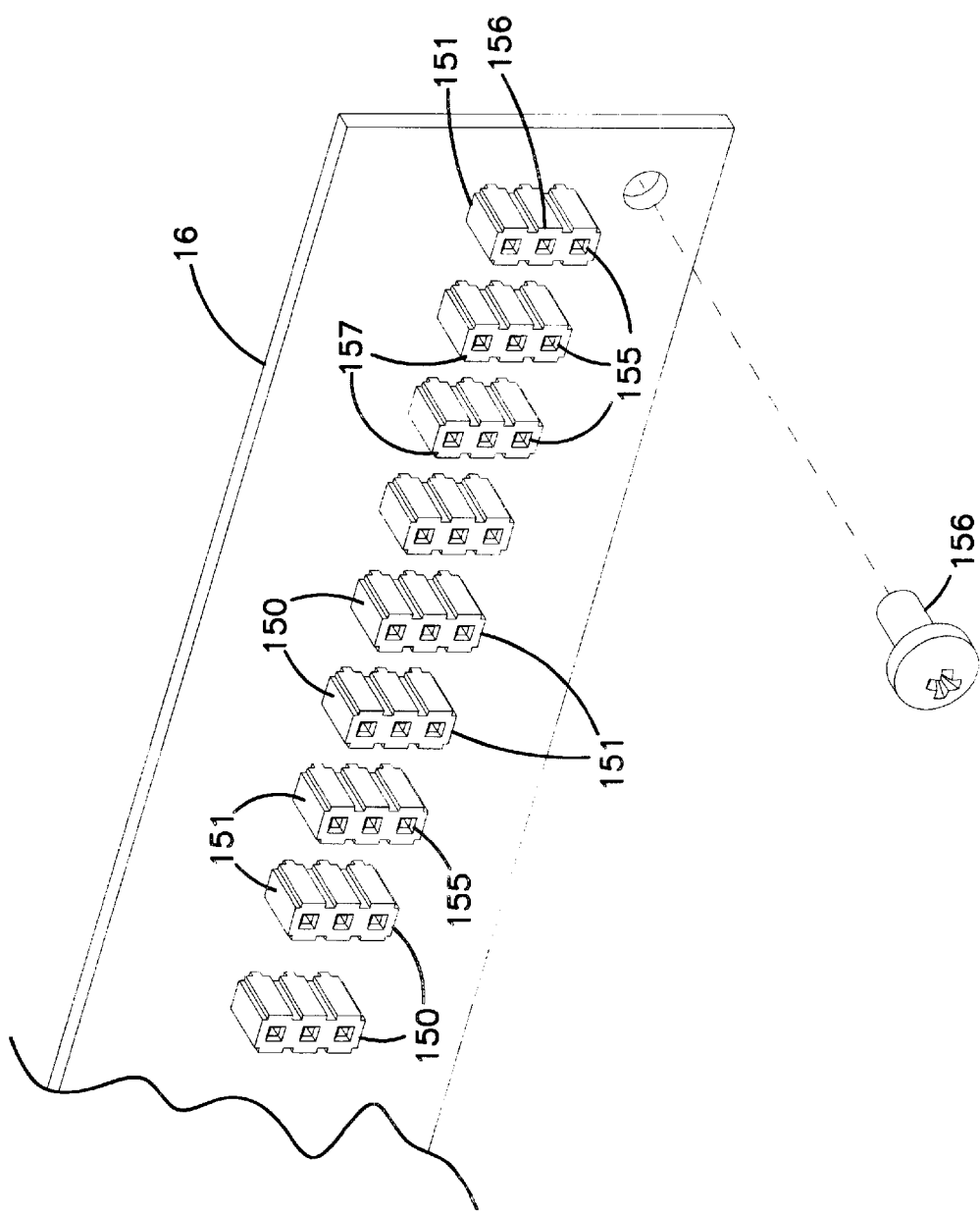
FIG. 10 is an enlarged fragmented perspective view of a circuit board with sockets depicted as part of the assembly in FIG. 1.

Secured to the frame 135 is the circuit board 16 (FIG. 1, FIG. 9, and FIG. 10). Specifically, as can be seen in FIG. 9, the circuit board 16 is mounted to the mounting wall 143, and on the opposite side of the wall 143 as shown in FIG. 9. Fasteners 156 are usable to mount the circuit board 16 to the wall 143, as are a variety of other securing structure. The circuit board 16 includes a plurality of sockets 150 (FIGS. 1 and 10) secured thereto and in electrical contact therewith. In preferred embodiments, the sockets 150 deliver power and ground contacts to the plurality of conductive pins 107. Each of the sockets 150 includes a shroud 151 (FIG. 10) sized and shaped to be received by one of the shrouds 112 protecting the third set of pins 107. This shroud-to-shroud arrangement 112, 151 also helps in aligning the jack 14 with the circuit board 16. In FIG. 10, note that each shroud 151 includes 3 sockets 155, 156, 157, one for each pin 108, 109, 110. Power and shield ground connections are provided to circuit board 16 by soldering these connections to the printed circuit board 16 at terminal block 152. The mounting wall 43 defines an access opening 154 for the terminal block 152.

Other features of the assembly 10 and viewable in FIGS. 1, 8, and 10 include first and second mounting brackets 160, 161 secured to the side walls 144, 145, respectively. The brackets 160, 161 are usable to mount the chassis 12 to framework. Fasteners 163 are usable to secure the brackets 160, 161 to the side walls 144, 145, as are a variety of other securing mechanisms. A tray 166 extends from the base 136 and defines a trough 168 therebetween. The trough 168 holds cables or wires for the cross-connect wires leading to the cross-connect pins 90. In FIG. 9, a tray 170 is shown extending from base 136. The tray 170 helps to hold and manage cables leading to the in/out pins 100. The tray 170 includes a plurality of lances 172 that are oriented to accept cable tie wrap loops to secure bundles of cables.

In the particular embodiment illustrated, the chassis 12 can accommodate at least 50, no greater than 84, and typically 64 jacks 14. In operation, to assemble the jack and chassis assembly 10, the jack is operably mounted onto the frame 135 through the open front face 146. When inserting the jack 14 into one of the aligned slot pairs 142, the lower rail 22 is slid along the slide surface 28 into one of the slots 140. The upper rail 21 is simultaneously slid through one of the upper slots 141. The tab 30 is depressed by the user to help latch the jack 14 into the chassis 12. The plurality of conductive pins 107 is inserted into one of the sockets 150. Inserting these pins 107 into the socket 150 provides power and ground connections to the jack 14. This also results in the second plurality of connective locations 100 projecting through and being accessible through the open back face 148. Next, the wires may be connected to the pins 100. In particular, a wire carrying an incoming ring signal is connected to pin 101, while an incoming tip signal is connected to pin 102. A wire to output a ring signal is connected to pin 104, and a wire to output a tip signal is connected to pin 105.

The first set of connective locations 90 may also be wire connected, typically to another jack. These connections are made on pins 91–95.

II. Additional Features; FIGS. 11–21

Figure 11:
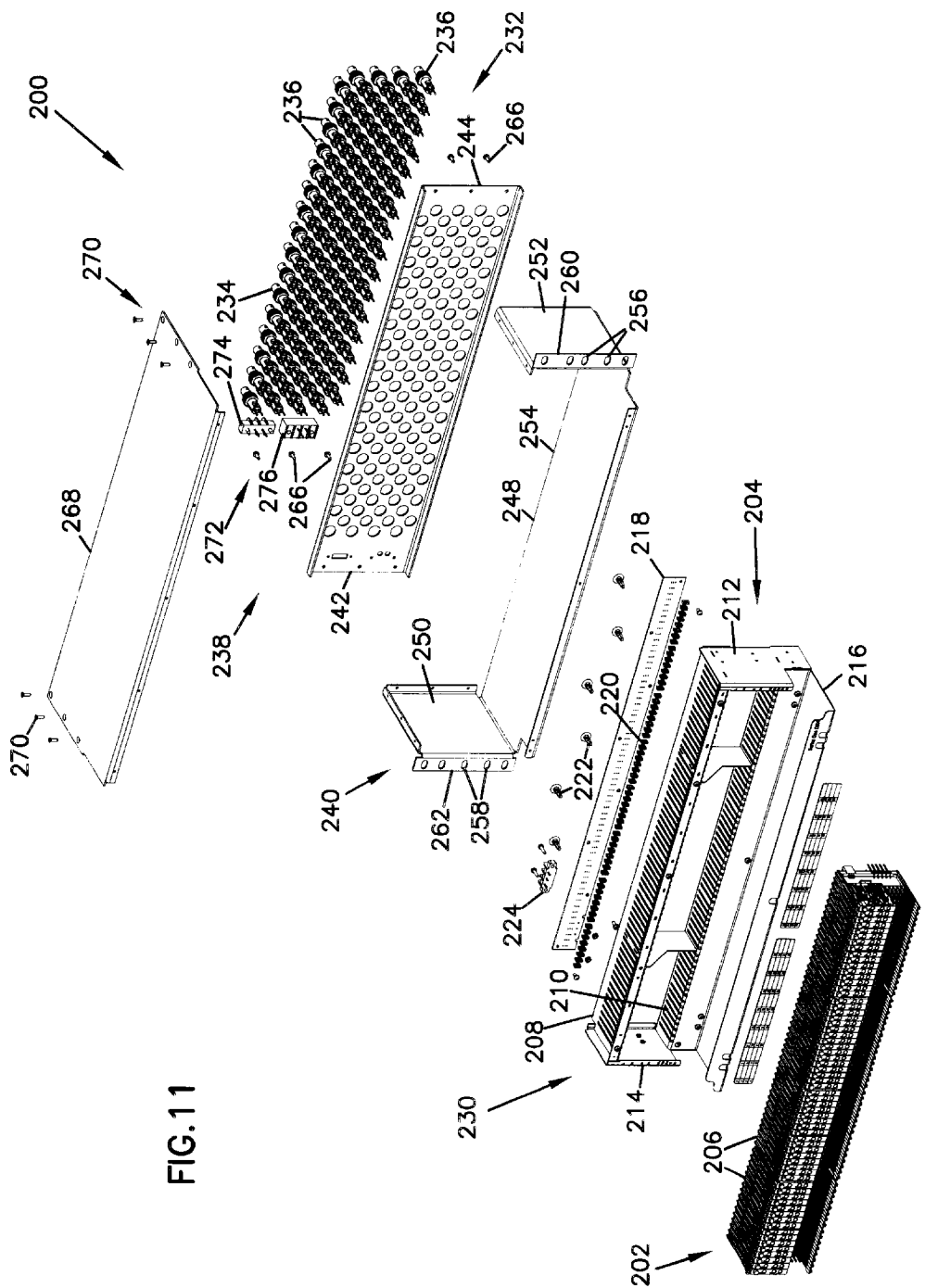
FIG. 11 is an exploded, perspective view of a jack and chassis assembly, constructed according to principles of this disclosure.

Attention is now directed to FIG. 11, in which another embodiment of a jack and chassis assembly is shown generally at 200. The assembly 200 includes the features described above with respect to the embodiment of FIGS. 1–10, including a plurality of jacks 202, and a chassis 204. The plurality of jacks 202 is made up of at least one and preferably several individual jacks 206, each being constructed as described above with respect to jack 14 in FIGS. 2–7. The chassis 204 is similar to the chassis 12 (FIG. 1) and includes a first frame 208. The first frame 208 defines a series of mounting slots 210 for accommodating the jacks 206. As can also be seen in FIG. 11, the first frame 208 includes a pair of side walls 212, 214 and a front service tray 216 for holding cables and wires. As can also be seen in FIG. 11, there is a circuit board 218 holding a plurality of sockets 220 for connection with the jacks 206. The circuit board 218 and sockets 220 are identical to the circuit board 16 and sockets 150 described with respect to the embodiment of FIGS. 1–10. The circuit board 218 is mounted to the first frame 208 by way of fasteners 222. Also mounted to the circuit board 218 is a first terminal block 224. Terminal block 224 is analogous to the terminal block 152 and provides power and shield ground connections/signals to the circuit board 218. The plurality of jacks 202 along with the circuit board 218 forms a DSX jack system 230.

In some preferred implementations, it is desirable to connect the DSX jack system 230 to other components before being connected to equipment. For example, in some instances, it is desirable to connect the DSX jack system 230 to equipment that has coaxial signals, such as DS-1. Thus, in some implementations, a signal conversion system 232 is provided as an interface between the DSX jack system 230 and other equipment. In the particular embodiment shown in FIG. 11, the signal conversion system 232 includes at least one converter 234 that is preferably directly wired to the respective jack 206. For example, and in reference now to FIG. 2, the converter 234 is directly wired to the second plurality 100 of connective locations, shown as wire termination pins 101–105. In use, one of the pins 101–105 does not need to be used. When used with converter 234, pin 103 (sleeve ground) is not used.

The converter 234 can include many types of signal conversions. Of those types useable, in the particular embodiment shown in FIG. 11, the converter 234 is a balun. The balun 236 provides an impedance match between the DSX jack system 230 and other equipment. In particular, the balun 236 converts from 75 ohm coaxial signals to 120 ohm twisted pair signals. FIG. 11 shows a plurality of baluns 236, which in preferred embodiments, each individual jack 206 will be connected to two individual baluns 236.

In preferred arrangements, the plurality of baluns 236 is held or mounted in a mounting arrangement 238. The mounting arrangement 238 is designed to permit convenient servicing of the jack and chassis assembly 200. For example, it is desirable that the jack and chassis assembly 200 be easily accessible by a technician to permit adjustment in the wiring between each balun 236 and each jack 206. In the particular arrangement shown in FIG. 11, the mounting arrangement 238 includes a frame 240 (this being the "second frame" of the jack and chassis assembly 200) and a mounting panel 242.

The mounting panel 242 includes a planar sheet 244 defining a plurality of mounting apertures 246. Each balun 236 is received within one of the apertures 246 such that it is held in the mounting arrangement 238 for connection with the plurality of jacks 202. In the orientation shown in FIG. 11, the mounting panel 242 holds the baluns 236 in a vertical orientation facing in opposition to the vertical post 24 of each of the jacks 206 (see FIG. 3).

The frame 240 includes a base 248 and a pair of end sides or flanges 250, 252. The base 248 extends between the end flanges 250, 252. In the particular embodiment shown in FIG. 11, the end flanges 250, 252 are oriented generally normal to the base 248. In operation, the base 248 functions as a supporting floor or surface 254 and the end flanges 250, 252 receive the chassis 204 therewithin. As can be seen in FIG. 11, each of the end flanges 250, 252, include mounting apertures 256, 258 defined by mounting flanges 260, 262, respectively. The mounting flanges 260, 262 extend from the side flanges 250, 252. Mounting flanges 260, 262, including the apertures 256, 258, can be used to secure the jack and chassis assembly 200 to other supporting framework.

In preferred embodiments, the mounting panel 242 is removably secured to the frame 240. Fasteners 266 are used to bolt the mounting panel 242 to the frame 240. This connection will hold the panel 242 of baluns 236 in a vertical orientation and normal to the base 248. The mounting panel 242 is also held normal to the end sides or flanges 250, 252.

Figure 12:
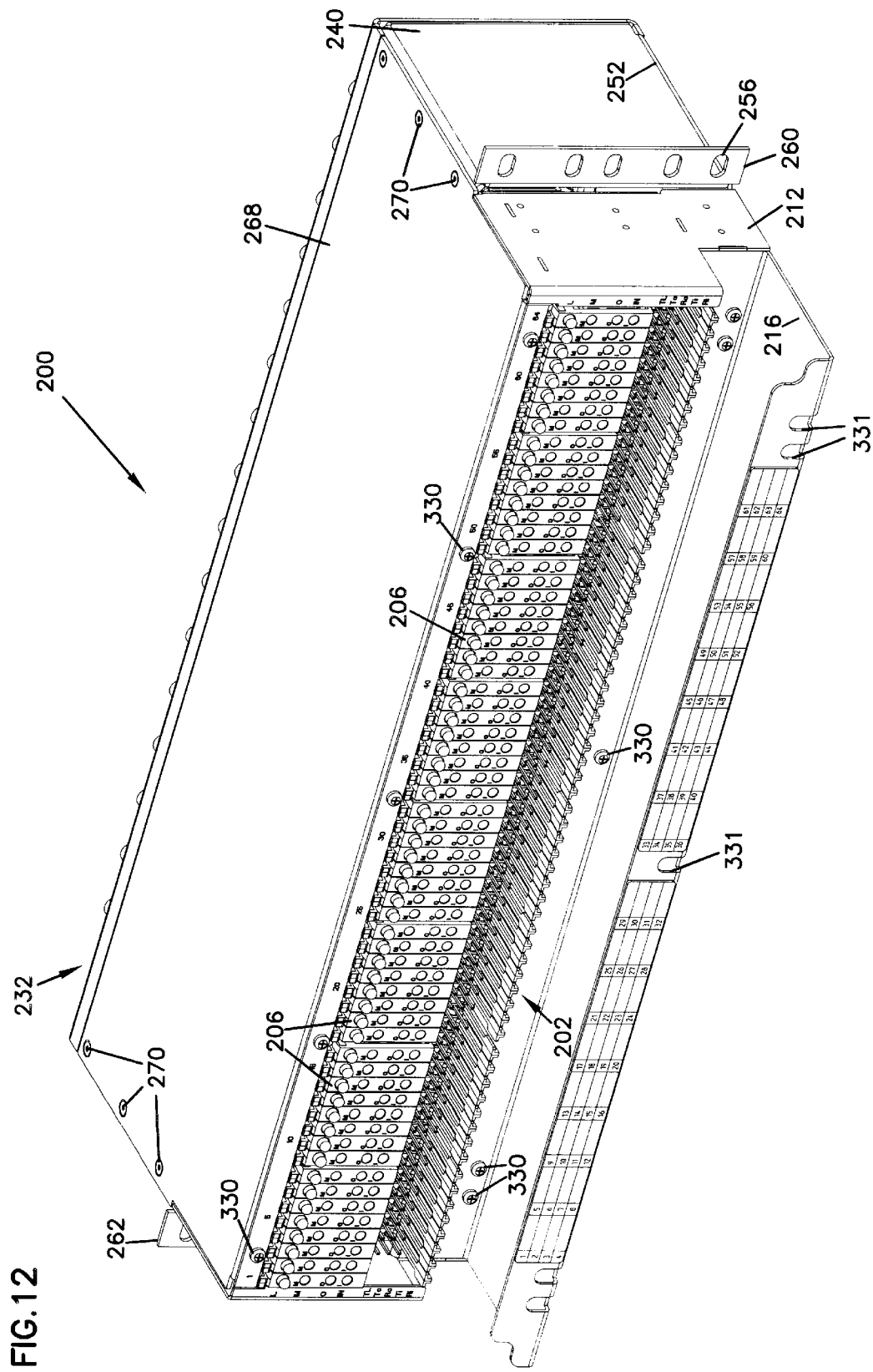
FIG. 12 is a front, top perspective view of the jack and chassis assembly depicted in FIG. 11 and assembled.

Also shown in FIG. 11 is a removable cover 268. The cover 268 functions to protect the jack and chassis assembly 200. In FIG. 12, it can be seen how the cover 268 extends over to cover the mounting arrangement 238 as well as the DSX jack system 230. The cover 268 is shown in the example in FIG. 11 as being removably secured by way of fasteners 270.

Still in reference to FIG. 11, the signal conversion system 232 also includes, in the preferred embodiment illustrated in FIG. 11, a terminal block arrangement 272. The terminal block arrangement 272 is preferably mounted within the mounting panel 242 and provides a power signal, a power ground signal, and a shield ground signal to the circuit board 218 and the sockets 220. The signals are provided by way of a hard wire connection between the terminal block arrangement 272 and the first terminal block 224 mounted on the circuit board 218. In the particular preferred embodiment illustrated, the terminal block arrangement 272 includes a pair of terminal blocks identified as a second terminal block 274 and a third terminal block 276. Further details on the terminal block connections are described below.

Figure 13:
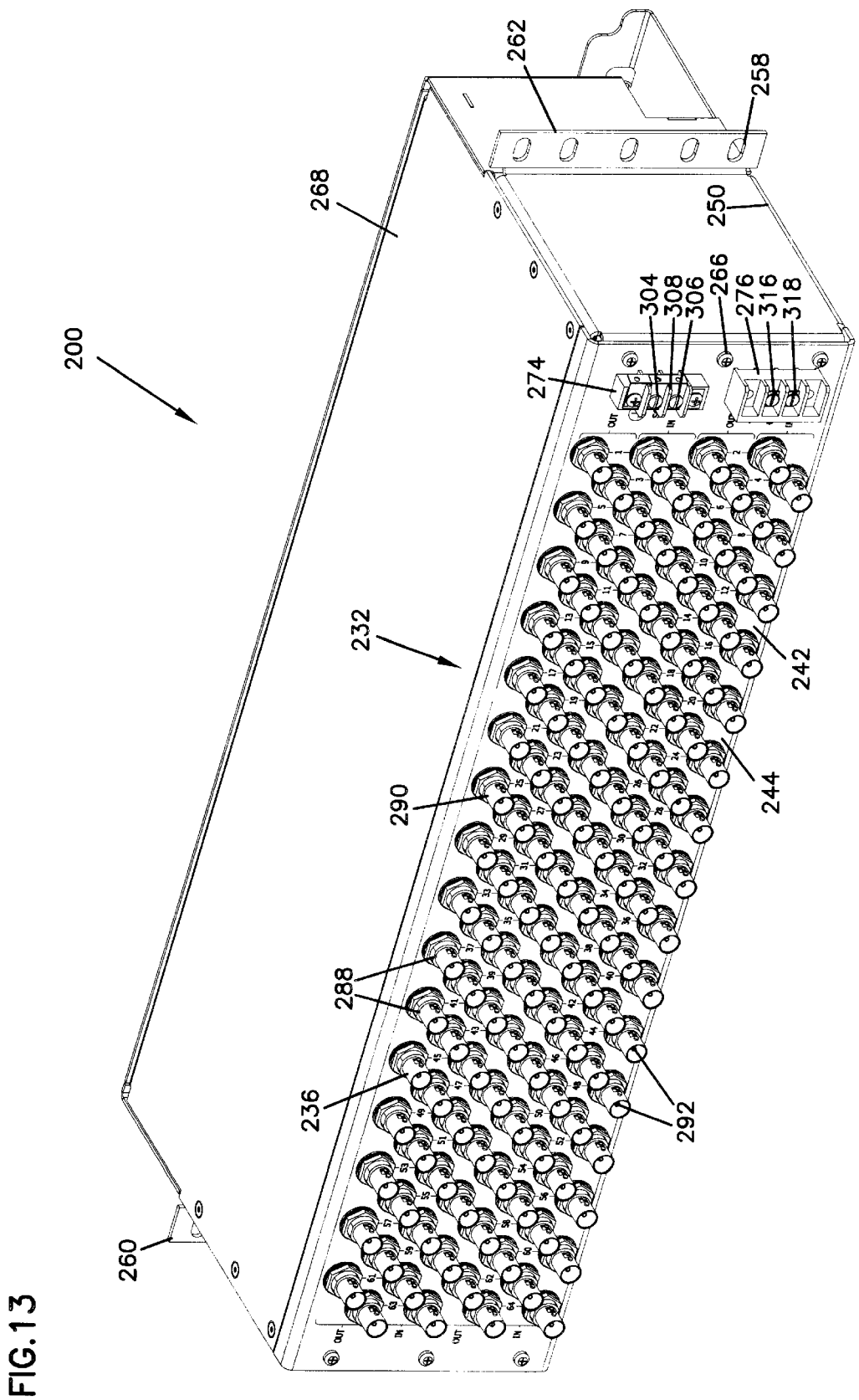
FIG. 13 is a top, rear perspective view of the jack and chassis assembly depicted in FIGS. 11 and 12.
Figure 17:
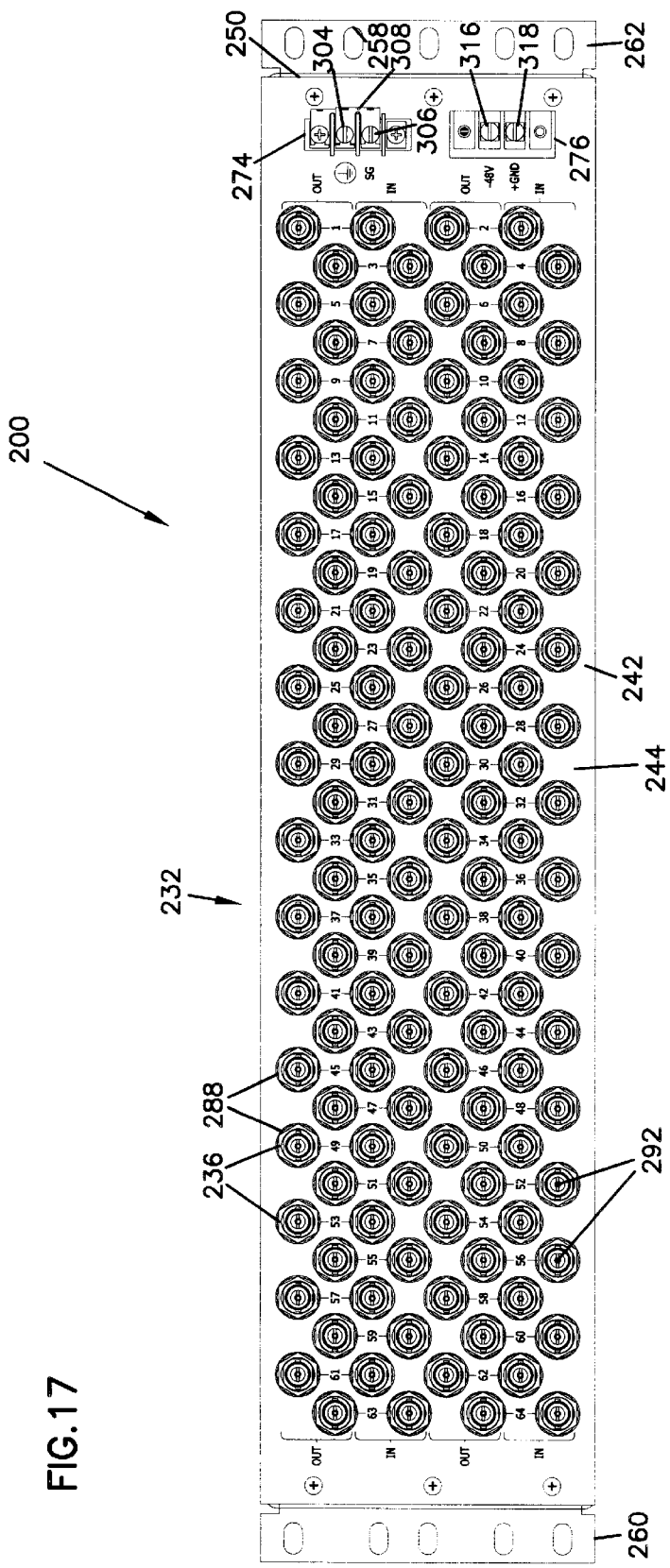
FIG. 17 is a rear elevational view of the jack and chassis assembly depicted in FIGS. 11 and 12.

Attention is next directed to FIG. 19. FIG. 19 illustrates one embodiment of a balun 236, enlarged, in perspective view. The balun 236 includes a dielectric body 280 and a connector 282. The body 280 contains appropriate electronics, e.g. a transformer, etc., for providing the impedance match between the signals. Connection locations 283 allow for electrical connection between the balun 236 and a respective jack 206. In the embodiment shown, the connection locations 283 includes a pair of wire wrap pins 284, 286. As can be seen, the wire wrap pins 284, 286 project and extend out from the body 280. The connector 284, in the embodiment shown, is a coaxial connector 288 and in particular, a BNC connector 290 holding a center conductor 292 (FIGS. 13 and 17). The BNC connector 290 includes a threaded section 294 for threaded connection for panel mount. In FIGS. 13 and 17, it can be seen how the plurality of baluns 236 is secured and arranged in the mounting panel 242 relative to the rest of the jack and chassis system 200.

Now in reference to FIGS. 20 and 21, the terminal block arrangement 272 is shown enlarged. The terminal block 274 is connected to provide a chassis ground signal and a shield ground signal. A pair of wire wrap pins 296, 298 project from the terminal block body 302 and permit hard wiring of the terminal block 274 to the first terminal block 224. FIGS. 13 and 17 show the opposite side of the terminal block 274. The chassis ground is shown at 304, while the shield ground is shown at 306. In the particular illustrated embodiment, the terminal block 274 also includes a clip 308 between the chassis ground 304 and the shield ground 306. The clip 308 provides common ground signals for the chassis and the shield. However, the clip 308 is removable from the terminal block 274 such that, if desired, the chassis ground 304 and shield ground 306 can be separate.

In reference again to FIG. 21, the third terminal block 276 is shown. The terminal block 276 includes a terminal body 310 and a pair of wire wrap pins 312, 314 projecting from the terminal block body 310. Attention is directed to FIGS. 13 and 17. The third terminal block 276 includes a power signal 316 for the LED 56 (FIG. 2) for each of the jacks 206 and a power ground signal 318. The power signal 316 and ground 318 are electrically connected to the jacks 206. This connection is made through the pins 312, 314 (FIG. 21), which are hard wired to the first terminal block 224. As explained above, the first terminal block 224 is electrically connected to each socket 220 in the circuit board 218. When the jacks 206 are mounted in the chassis 204, the jacks 206 connect to the circuit board 218 through the sockets 220.

FIG. 12 shows the jack and chassis assembly 200 assembled together and including the signal conversion system 232 secured thereto. An opposite perspective view of FIG. 12 is shown in FIG. 13. By comparing FIGS. 12 and 13, it can be seen how easily accessible the connection locations are on opposite sides of the assembly 200. On the front face of the assembly 200, the jacks 206 can be accessed, while on the rear side of the assembly 200 the coaxial connectors 288 can be accessed.

Figure 14:
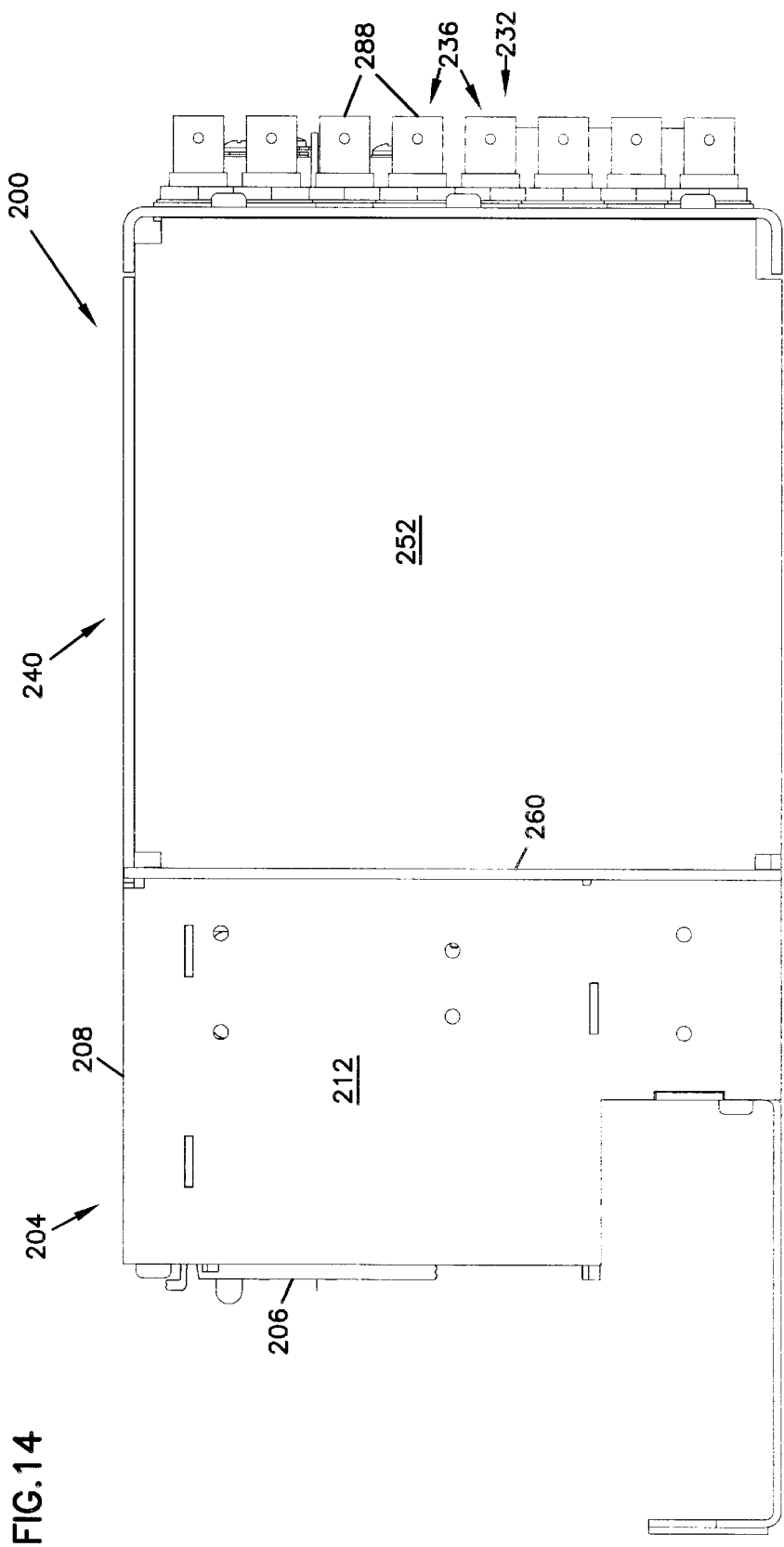
FIG. 14 is a side elevational view of the jack and chassis assembly depicted in FIG. 12.
Figure 15:
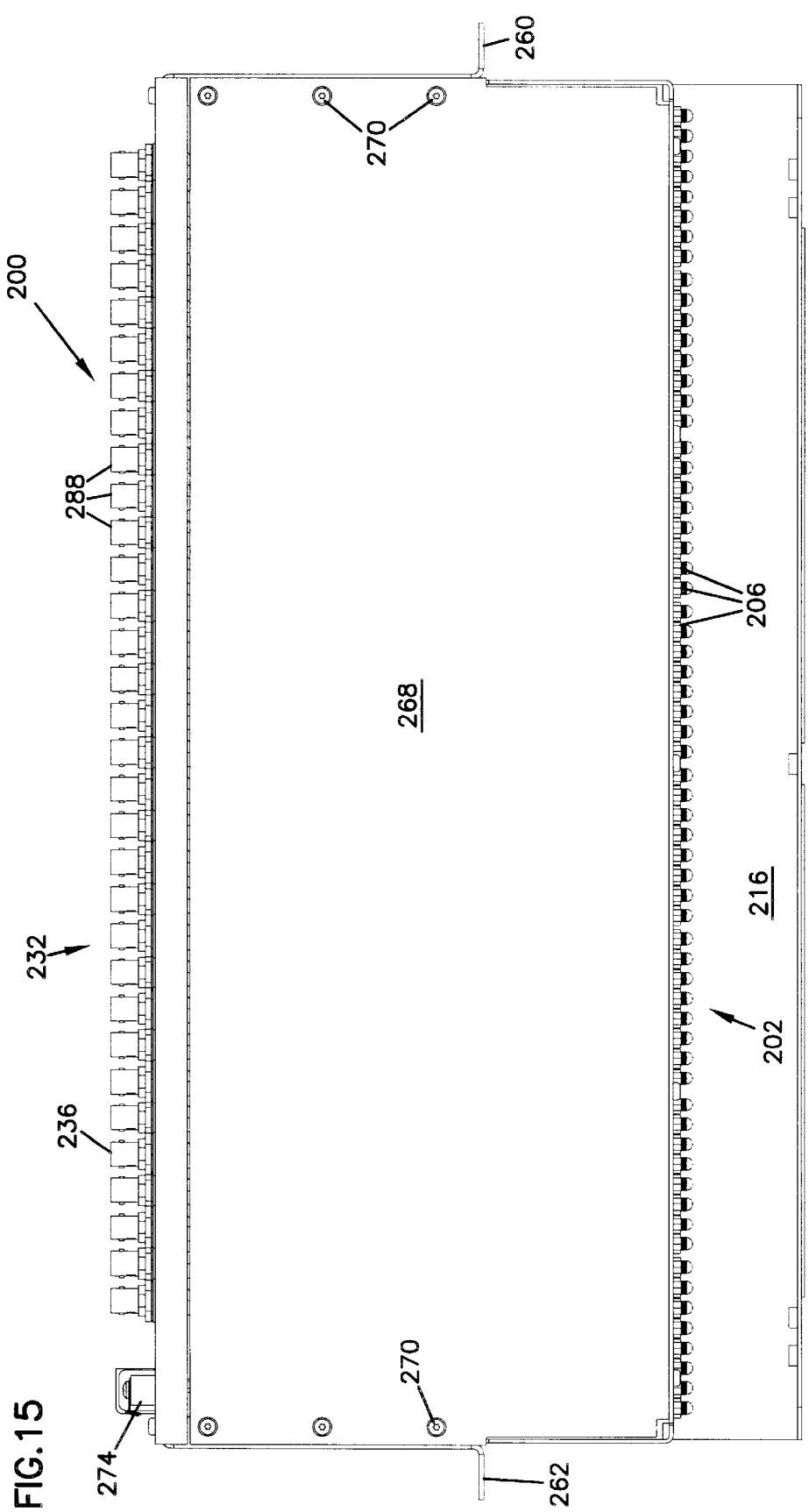
FIG. 15 is a top plan view of the jack and chassis assembly of FIGS. 11–14.
Figure 16:
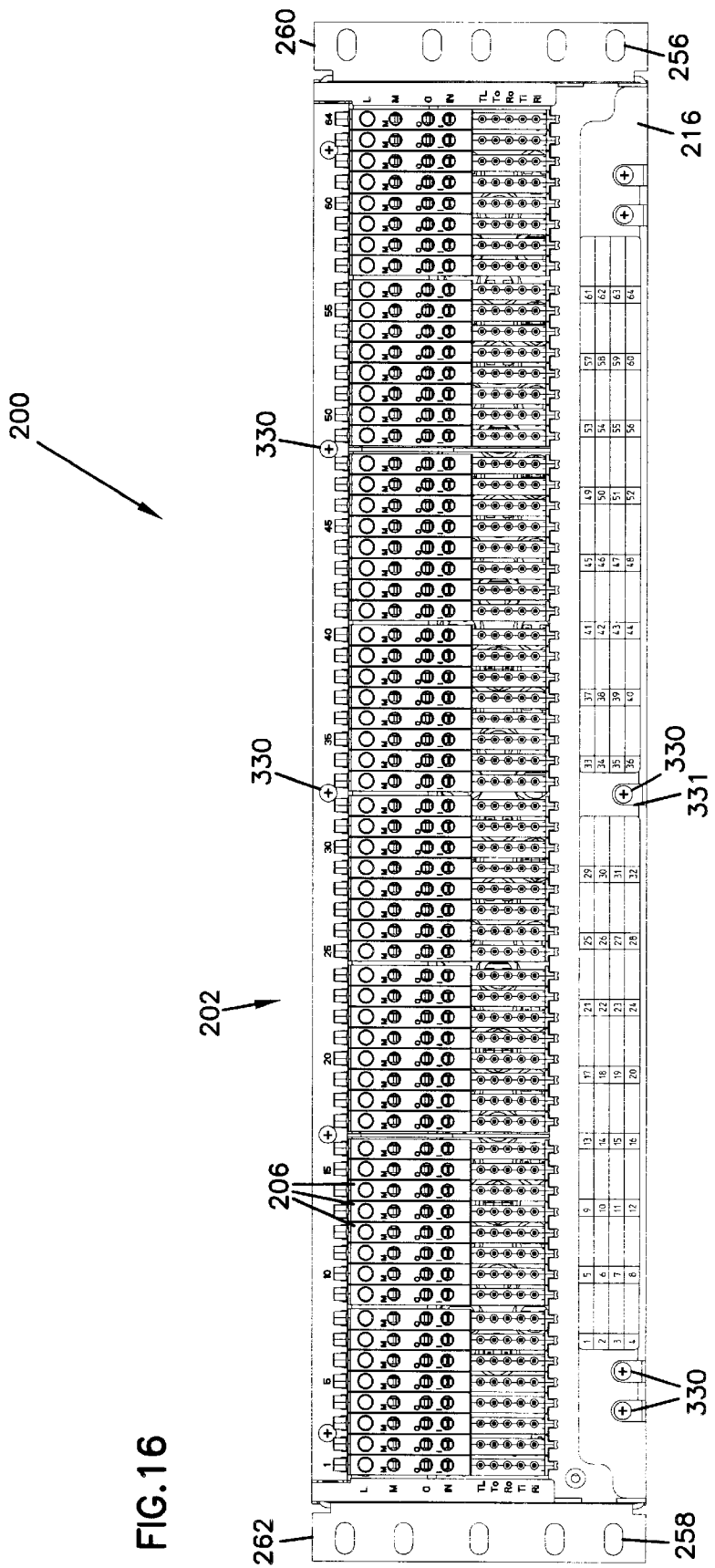
FIG. 16 is a front elevational view of the jack and chassis assembly depicted in FIG. 12.

FIG. 14 is a side elevational view of the assembly 200. It can be appreciated in FIG. 14 that the assembly 200 is in a conveniently arranged, compact construction permitting easy access to the jacks 206 and the connectors 288. A top plan view of the assembly is shown in FIG. 15, while front and rear views are shown in FIGS. 16 and 17, respectively.

Figure 18:
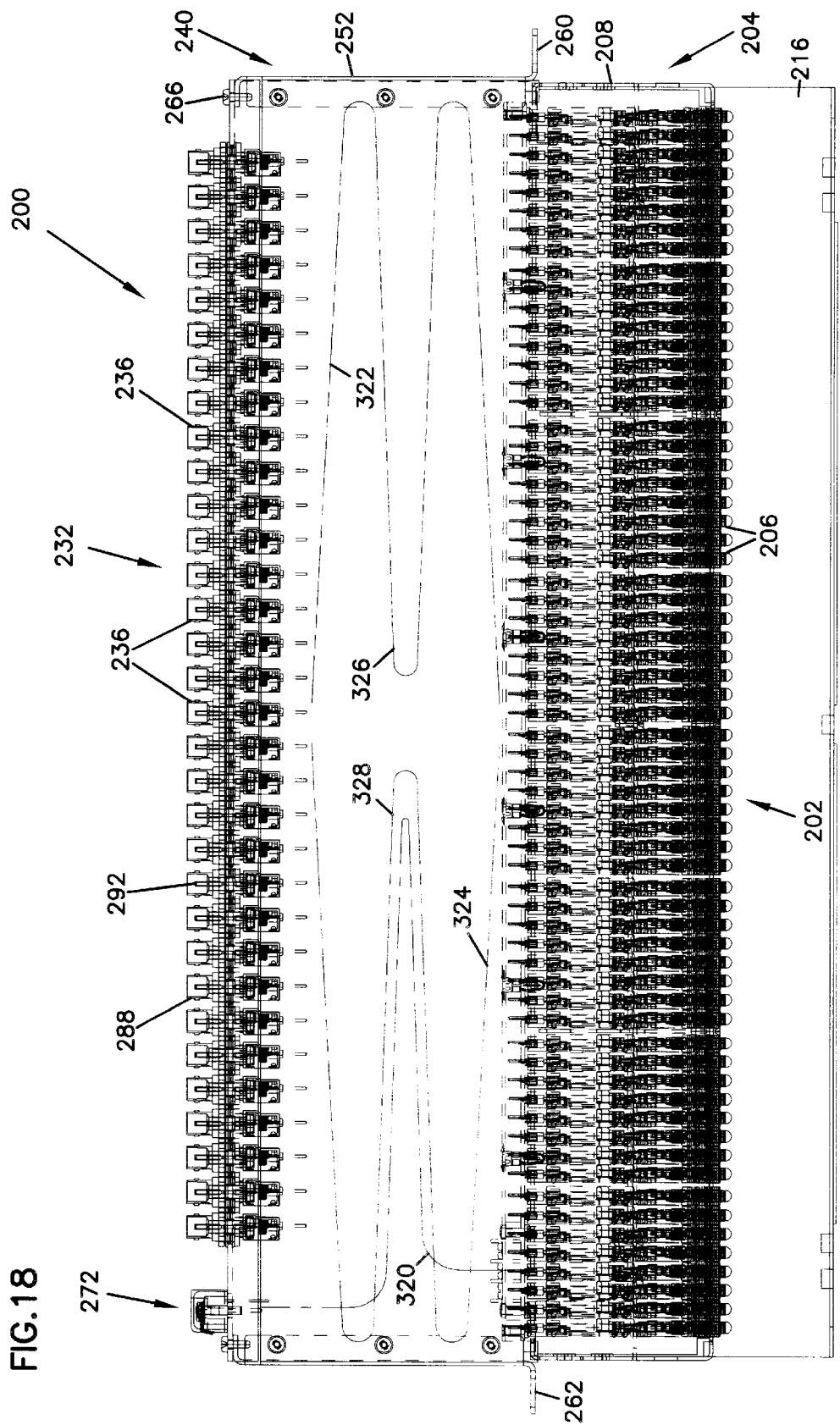
FIG. 18 is a schematic, top plan view of the jack and chassis assembly depicted in FIGS. 12–17, and with wire service bundles shown schematically.

In FIG. 18, a schematic, top plan view is illustrated of the assembly 200. The connection between the terminal block arrangement 272 and the first terminal block 224 can be seen schematically by the line 320 showing that connection. As explained above, each of the jacks 206 is hard wire connected to two respective baluns 236 by connecting the wire wrap pins 101, 102, 104, 105 (FIG. 2) to the wire wrap pins 284, 286 (FIG. 19) of two of the baluns 236. It can be appreciated that with each jack 206 hard wired to two of the baluns 236, there will be a large amount of cables or wires. In preferred embodiments, the cables and wires will be bundled together in at least one bundle and preferably more than one bundle of cables to provide service bundles 322, 324. The bundles 322, 324 are made sufficiently long enough such that there is some slack 326, 328 in the bundles 322, 324 when the assembly 200 is completely connected and assembled together. Preferably, the length of the bundles 322, 324 will be at least 6 inches, and preferably 8–12 inches. The slack 326, 328 creates "service loops." When the connections between the jacks 206 and the baluns 236 need servicing or adjustment, or when one of the jacks 206 or baluns 236 needs replacement, the chassis 204 holding the plurality of jacks 202 can be laterally spaced from the second frame 240, while maintaining electrical connection between the jacks 206 and the baluns 236. The slack 326, 328 permits the lateral spacing of the DSX jack system 230 from the second frame 240 holding the signal conversion system 232.

As can be appreciated, the jack and chassis assembly 200 is structured for convenient servicing of the DSX jack system 230. A method for servicing the jack system 230 includes providing the plurality of jacks 202 mounted in the first frame 208 in the chassis 204. Each of the jacks 206 is constructed, preferably, according to the description corresponding to FIGS. 2–7 above. The circuit board 218 is provided and is secured to the first frame 208 and in electrical connection with each of the jacks 206. The first frame 208 holding the plurality of jacks 202 is removed from the second frame 240 supporting the panel 242 of baluns 236 electrically connected to the jacks 206. This is done while maintaining the electrical connection between the jacks 206 and the baluns 236, as well as maintaining the connection between the jacks 206 and the circuit board 218. While maintaining these connections between the jacks 206 and the baluns 236 and the jacks 206 and the circuit board 218, a space is provided between the plurality of jacks 202 and the panel 242 of baluns 236 sufficient to permit service access to the second plurality of connection locations 100 (FIG. 2) of each of the jacks 206.

A technician may then service the assembly 200. The hard wire connections between the jacks 206 and the baluns 236 can be adjusted. The method of servicing also includes removing the fasteners 330 (FIGS. 12 and 16) from between the first frame 208 and the cover 268. Note that, in preferred arrangements, the tray 216 has apertures 331 to permit access to the fasteners 330. In addition, the cover 268 can also be removed from the assembly by removal of the fasteners 270. The chassis 204 is permitted to be laterally moved from the panel 242 of baluns 236 without disrupting the connection between the jacks 206 and the baluns 236 because of the slack 326, 328 in the cable bundles 322, 324.

The above specification, examples and data provide a description of embodiments of the invention. Many embodiments can be made.

What is claimed is:

1. A jack and chassis assembly comprising:
   (a) a jack including:
      (i) a body comprising a dielectric material; said body having a forward wall; an opposite rear wall; and defining an interior chamber and a plurality of bores;
         (A) said plurality of bores extending through said forward wall in communication with said interior chamber;

(B) each of said bores being sized to receive a plug having a tip contact and a ring contact;
(ii) a plurality of electrically conductive spring contacts oriented within said interior chamber;
  (A) each of said spring contacts including tip spring contacts and ring spring contacts;
  (B) said tip spring contacts being disposed to make electrical contact with tip contacts of plugs inserted within said bores;
  (C) said ring spring contacts being disposed to make electrical contact with ring contacts of plugs inserted within said bores;
(iii) a first plurality of connection locations secured to said body and projecting from said forward wall;
(iv) a second plurality of connection locations secured to said body and projecting from said rear wall;
(v) a plurality of conductive pins secured to said body and projecting from said rear wall; and
(vi) a first circuit board secured to said body; said first circuit board including a first and second plurality of circuit paths;
  (A) said first plurality of circuit paths disposed on said first circuit board to make electrical contact between said plurality of spring contacts and said first plurality of connection locations;
  (B) said second plurality of circuit paths disposed on said first circuit board to make electrical contact between said plurality of spring contacts and said second plurality of connection locations;
(b) a chassis; said chassis defining a first frame;
  (i) said jack being removably mounted to said first frame;
(c) a second circuit board mounted on said first frame of said chassis; said second circuit board having a socket secured thereto and in electrical contact therewith;
  (i) said socket being in receipt of and in electrical contact with said plurality of conductive pins;
(d) a panel supporting a converter arrangement;
  (i) said converter arrangement being in electrical contact with said second plurality of connection locations; and
(e) a second frame holding said first frame; said panel being secured to said second frame.

2. An assembly according to claim 1 wherein:
(a) said converter arrangement includes at least two baluns; each of the baluns being in electrical contact with said second plurality of connection locations.

3. An assembly according to claim 2 wherein:
(a) said second frame includes a base, a first side flange, and a second side flange;
  (i) said base extending between said first side flange and said second side flange;
  (ii) said second frame defining an open front face and an open rear face;
    (A) said first frame being mounted through said open front face and between said first side flange and said second side flange; and
    (B) said panel holding said balun being mounted through said open rear face and between said first side flange and said second side flange.

4. An assembly according to claim 3,
(a) wherein said second circuit board has a plurality of sockets secured thereto and in electrical contact therewith; and (b) further comprising a plurality of jacks;
  (i) each of said jacks being mounted in said first frame;
  (ii) each of said plurality of conductive pins of each of said jacks being received by and in electrical contact with a respective socket of said plurality of sockets secured to said second circuit board; and
  (iii) each of said second plurality of connection locations of each of said jacks projecting and being accessible through a rear face of said first frame.

5. An assembly according to claim 4 further comprising:
(a) a plurality of baluns;
  (i) each balun of said plurality of baluns being mounted within said panel;
  (ii) each balun of said plurality of baluns being in electrical contact with a respective jack of said plurality of jacks;
    (A) said second plurality of connection locations of each of said jacks being electrically connected to two respective baluns.

6. An assembly according to claim 5 wherein:
(a) each balun of said plurality of baluns includes a pair of pins in electrical connection with the second plurality of connection locations of a respective jack of said plurality of jacks; and a coaxial connector.

7. An assembly according to claim 6 further including:
(a) a first terminal block on said second circuit board; said terminal block providing a power signal; a power ground signal; and a shield ground signals to each of said plurality of sockets.

8. An assembly according to claim 7 further including:
(a) a terminal block arrangement mounted within said panel; said terminal block arrangement providing said power signal, said power ground signal; and said shield ground signal to said first terminal block.

9. An assembly according to claim 8 wherein:
(a) said terminal block arrangement includes:
  (i) a second terminal block providing said shield ground signal and a chassis ground signal; and
  (ii) a third terminal block providing said power signal and said power ground signal.

10. An assembly according to claim 6 wherein:
(a) each of said jacks further includes an LED having first and second electrical leads;
(b) said first plurality of connection locations for each of said jacks includes first, second, third, fourth, and fifth wire termination pins;
  (i) said first pin constructed and arranged to be in electrical contact with a ring signal from a cross-connect signal;
  (ii) said second pin constructed and arranged to be in electrical contact with a tip signal from a cross-connect signal;
  (iii) said third pin constructed and arranged to output a ring signal;
  (iv) said fourth pin constructed and arranged to output a tip signal;
  (v) said fifth pin being in electrical contact with said second electrical lead of said LED through said first circuit board;
(c) said plurality of conductive pins for each of said jacks includes first, second, and third pins;
  (i) said first pin of said plurality of conductive pins constructed and arranged to be in electrical contact with said power signal;
  (ii) said second pin of said plurality of conductive pins constructed and arranged to be in electrical contact with said first ground signal;

(iii) said third pin of said plurality of conductive pins being constructed and arranged to be in electrical contact with said second ground signal to provide selective grounding of said LED;

(d) said second plurality of connection locations for each of said jacks includes first, second, third, and fourth wire termination pins each in electrical contact with a pin in one of the pin pairs in a respective one of the plurality of baluns;

(i) said first pin of said second plurality of connection locations constructed and arranged to be in electrical contact with an incoming ring signal;

(ii) said second pin of said second plurality of connection locations constructed and arranged to be in electrical contact with an incoming tip signal;

(iii) said third pin of said second plurality of connection locations constructed and arranged to be in electrical contact with an outgoing ring signal; and (iv) said fourth pin of said second plurality of connection locations constructed and arranged to be in electrical contact with an outgoing tip signal.

11. An assembly according to claim 5 further including:

(a) at least one plurality of wires bundled together extending between said plurality of jacks and said plurality of baluns;

(i) said at least one plurality of wires having a length sufficient to permit movement of the first frame from the second frame and allow service access therebetween.

12. An assembly according to claim 11 wherein:

(a) said length is at least 6 inches.

13. An assembly according to claim 12 wherein:

(a) said length is 8–12 inches.

14. An assembly according to claim 11 wherein:

(a) said second plurality of connection locations on each of the jacks includes a plurality of jack wire wrap pins; and (b) each of said baluns includes a plurality of balun wire wrap pins;

(i) the electrical contact between the jacks and the baluns being formed by connections between the jack wire wrap pins and the balun wire wrap pins.

15. A method for assembling a jack and chassis assembly; the method comprising:

(a) providing a jack including:

(i) a body comprising a dielectric material; the body having a forward wall; an opposite rear wall; and defining an interior chamber and a plurality of bores;

(A) the plurality of bores extending through the forward wall in communication with the interior chamber;

(B) each of the bores being sized to receive a plug having a tip contact and a ring contact;

(ii) a plurality of electrically conductive spring contacts oriented within the interior chamber;

(A) each of the spring contacts including tip spring contacts and ring spring contacts;

(B) the tip spring contacts being disposed to make electrical contact with tip contacts of plugs inserted within the bores;

(C) the ring spring contacts being disposed to make electrical contact with ring contacts of plugs inserted within the bores;

(iii) a first plurality of connection locations secured to the body and projecting from the forward wall;

(iv) a second plurality of connection locations secured to the body and projecting from the rear wall;

(v) a plurality of conductive pins secured to the body and projecting from the rear wall; and (vi) a first circuit board secured to the body; the first circuit board including a first and a second plurality of circuit paths;

(A) the first plurality of circuit paths disposed on the first circuit board to make electrical contact between the plurality of spring contacts and the first plurality of connection locations;

(B) the second plurality of circuit paths disposed on the first circuit board to make electrical contact between the plurality of spring contacts and the second plurality of connection locations;

(b) providing a chassis including a first frame; the first frame defining an open front face and open back face;

(c) operably mounting the jack onto the first frame through the open front face and such that the second plurality of connection locations projects and is accessible through the open back face;

(d) providing a second frame holding a pair of baluns;

(e) operably mounting the first frame with the jack onto the second frame; and (f) connecting the jack to the pair of baluns.

16. A method according to claim 15 further including:

(a) said step of providing a second frame holding a pair of baluns includes providing a second frame including a panel secured thereto; the panel having the baluns mounted therein.

17. A method according to claim 16 wherein:

(a) said step of connecting the jack to the pair of baluns includes connecting the second plurality of connection locations in the jack to a pair of pins in each of the baluns.

18. A method according to claim 17 wherein:

(a) said step of providing a chassis includes providing a chassis having a second circuit board mounted thereon; the second circuit board having a socket secured thereto and in electrical contact therewith; the second circuit board also having a terminal block providing a power signal, a first ground signal, and a second ground signal; and (b) said step of operably mounting the jack includes inserting the plurality of conductive pins into the socket.

19. A method according to claim 18 further including:

(a) electrically connecting the terminal block on the second circuit board to a terminal block arrangement mounted in the panel.

20. A method according to claim 16 wherein:

(a) said step of providing a chassis includes providing a chassis having a second circuit board mounted thereon having a plurality of sockets secured thereto and in electrical contact therewith;

(b) said step of operably mounting the jack onto the frame includes operably mounting a plurality of jacks through the open front face and inserting the plurality of conductive pins of each of the jacks into a respective one of the plurality of sockets;

(i) the second plurality of connection locations of each jack projecting and being accessible through the open back face;

(c) said step of providing a second frame with a panel secured thereto includes providing the second frame with the panel secured thereto, and the panel holding a plurality of baluns therein; and (d) said step of connecting the jack to the balun includes connecting the second plurality of connection locations in each jack of the plurality of jacks to a pair of pins in the balun in each of the plurality of baluns.

21. A chassis assembly for a DSX system; the chassis assembly comprising:
    (a) a first frame having:
        (i) a first longitudinally extending wall defining a first plurality of receiving slots;
        (ii) a second longitudinally extending wall in opposition to said first longitudinally extending wall; said second longitudinally extending wall defining a second plurality of receiving slots in alignment with said first plurality of receiving slots to form a plurality of aligned slot pairs;
            (A) each of said aligned slot pairs being sized to receive a jack therewithin;
        (iii) a first sidewall and a second sidewall extending between said first and second longitudinally extending walls;
            (A) said first sidewall, said second sidewall, said first longitudinally extending wall, and said second longitudinally extending wall defining an open, unobstructed front face and an open, unobstructed back face;
                (1) said open, unobstructed front face being in open communication with each of said aligned slot pairs; and
                (2) said open, unobstructed back face being in open communication with said first plurality of receiving slots;
    (b) a second frame having:
        (i) a first end flange;
        (ii) a second end flange; and
        (iii) a base extending between said first end flange and said second end flange; and
            (A) said first frame being mounted in said second frame over said base and between said first side flange and said second side flange.

22. A chassis assembly according to claim 21 further including:
    (a) a panel secured to said second frame; said panel having a plurality of mounting apertures.

23. A chassis assembly according to claim 21 further including:
    (a) a cover secured to said second frame and covering each of said first frame and said second frame.

24. A chassis assembly according to claim 21 further comprising:
    (a) a circuit board depending from said second longitudinally extending wall; said circuit board having a plurality of sockets secured thereto and in electrical contact therewith.

25. A method for servicing a jack assembly comprising:
    (a) providing a plurality of jacks mounted in a first frame in a chassis; each of the jacks including:
        (i) a body comprising a dielectric material; the body having a forward wall; an opposite rear wall; and defining an interior chamber and a plurality of bores;
            (A) the plurality of bores extending through the forward wall in communication with the interior chamber;
            (B) each of the bores being sized to receive a plug having a tip contact and a ring contact;
        (ii) a plurality of electrically conductive spring contacts oriented within the interior chamber;
            (A) each of the spring contacts including tip spring contacts and ring spring contacts;
            (B) the tip spring contacts being disposed to make electrical contact with tip contacts of plugs inserted within the bores;
            (C) the ring spring contacts being disposed to make electrical contact with ring contacts of plugs inserted within the bores;
        (iii) a first plurality of connection locations secured to the body and projecting from the forward wall;
        (iv) a second plurality of connection locations secured to the body and projecting from the rear wall;
        (v) a plurality of conductive pins secured to the body and projecting from the rear wall; and
        (vi) a first circuit board secured to the body; the first circuit board including a first and second plurality of circuit paths;
            (A) the first plurality of circuit paths disposed on the first circuit board to make electrical contact between the plurality of spring contacts and the first plurality of connection locations;
            (B) the second plurality of circuit paths disposed on the first circuit board to make electrical contact between the plurality of spring contacts and the second plurality of connection locations;
    (b) providing a second circuit board secured to the first frame and in electrical connection with each of the jacks;
    (c) removing the first frame holding the plurality of jacks from a second frame supporting a panel of baluns electrically connected to the jacks;
        (i) the step of removing including maintaining the connection between the plurality of jacks and the panel of baluns and maintaining the connection between the plurality of jacks and the second circuit board; and
    (d) while maintaining the connection between the plurality of jacks and the panel of baluns and maintaining the connection between the plurality of jacks and the second circuit board, providing a space between the plurality of jacks and the panel of baluns sufficient to permit service access to the second plurality of connection locations of each of the jacks.

* * * * *

UNITED STATES PATENT AND TRADEMARK OFFICE
CERTIFICATE OF CORRECTION

PATENT NO.    : 6,554,652 B1                                                     Page 1 of 1
DATED         : April 29, 2003
INVENTOR(S)   : Musolf et al.

It is certified that error appears in the above-identified patent and that said Letters Patent is hereby corrected as shown below:

Title page,
Item [75], Inventors, "Mapla Grove" should read -- Maple Grove --
Item [56], References Cited, FOREIGN PATENT DOCUMENTS, please insert
-- GB   1549201   8/1979 --;
OTHER PUBLICATIONS, please insert
-- ADC Communications brochure, "Digital Signal Cross-Connect (DSX-3) Front and Rear Cross-Connect Products", 2/99, 77 pages. --

Column 4,
Line 66, "terminations bay be" should read -- terminations may be --

Signed and Sealed this

Twenty-third Day of September, 2003

JAMES E. ROGAN
*Director of the United States Patent and Trademark Office*